United States Patent
Kanada et al.

(10) Patent No.: US 10,543,537 B2
(45) Date of Patent: Jan. 28, 2020

(54) METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

(71) Applicants: SUMITOMO ELECTRIC HARDMETAL CORP., Itami-shi (JP); Sumitomo Electric Industries, Ltd., Osaka-shi (JP); Sumitomo Electric Tool Net, Inc., Osaka-shi (JP)

(72) Inventors: Yasuyuki Kanada, Itami (JP); Kunishige Tanaka, Itami (JP); Soichiro Okumura, Itami (JP); Jun Okamoto, Osaka (JP); Futoshi Takeshita, Osaka (JP)

(73) Assignees: Sumitomo Electric Hardmetal Corp., Itami-shi (JP); Sumitomo Electric Industries, Ltd., Osaka-shi (JP); Sumitomo Electric Tool Net, Inc., Osaka-shi (JP)

( * ) Notice: Subject to any disclaimer, the term of this patent is extended or adjusted under 35 U.S.C. 154(b) by 49 days.

(21) Appl. No.: 15/758,036

(22) PCT Filed: Jul. 7, 2016

(86) PCT No.: PCT/JP2016/070144
§ 371 (c)(1),
(2) Date: Mar. 7, 2018

(87) PCT Pub. No.: WO2017/043171
PCT Pub. Date: Mar. 16, 2017

(65) Prior Publication Data
US 2018/0200802 A1 Jul. 19, 2018

(30) Foreign Application Priority Data

Sep. 9, 2015 (JP) .................................. 2015-177512

(51) Int. Cl.
*B23B 1/00* (2006.01)
*B23B 5/36* (2006.01)

(52) U.S. Cl.
CPC . *B23B 1/00* (2013.01); *B23B 5/36* (2013.01)

(58) Field of Classification Search
CPC .................................... B23B 1/00; B23B 5/38
See application file for complete search history.

(56) References Cited

U.S. PATENT DOCUMENTS 7,216,571 B2 * 5/2007 Schreiber .................. B23B 1/00
407/69
2003/0089204 A1 5/2003 Schreiber et al.
(Continued)

FOREIGN PATENT DOCUMENTS

DE 102006011300 B3 9/2007
EP 3246774 A1 11/2017
(Continued)

*Primary Examiner* — Alan Snyder
(74) *Attorney, Agent, or Firm* — Baker Botts L.L.P.; Michael A. Sartori

(57) ABSTRACT

A method for manufacturing a machine component having a rotation symmetry plane includes machining a rotation symmetry plane. The machining a rotation symmetry plane includes determining a track of the cutting. The determining a track determines the track in accordance with a condition that (1) a first end portion of the cutting edge is positioned at a cutting start position of the rotation symmetry plane, (2) N regions defined by division of the cutting edge successively come in contact with the rotation symmetry plane, (3) an inclination of a tangent line at a point of cutting of each of the N regions is equal to a target inclination of a tangent line which passes through the point of cutting and comes in
(Continued)

contact with the rotation symmetry plane in a cut plane of the rotation symmetry plane, and (4) a second end of the cutting edge is positioned at a cutting end position of the rotation symmetry plane.

5 Claims, 19 Drawing Sheets

(56) References Cited

U.S. PATENT DOCUMENTS

2010/0175518 A1  7/2010  Nille
2016/0288214 A1  10/2016  Ishihara

FOREIGN PATENT DOCUMENTS

| JP | 2009-241221 A | 10/2009 |
| WO | 01/43902 A2 | 6/2001 |
| WO | 2015/079836 A1 | 6/2015 |

* cited by examiner

FIG.28

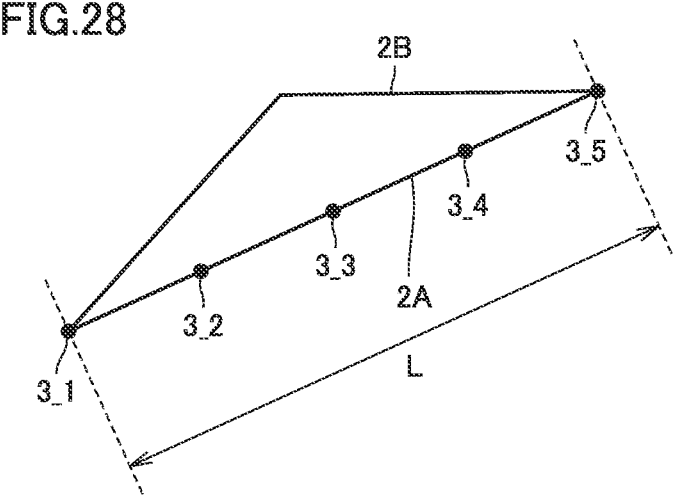

FIG.29

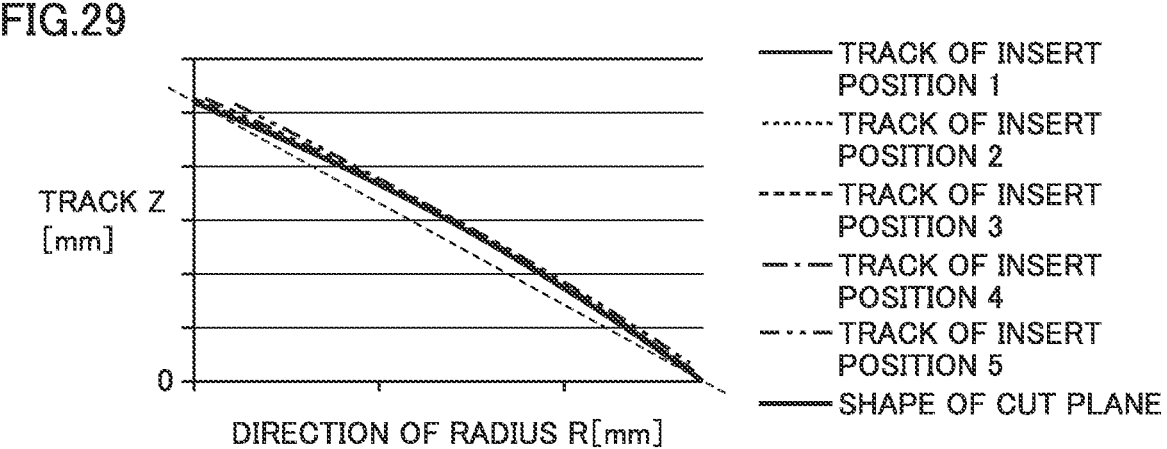

TRACK Z [mm]

DIRECTION OF RADIUS R[mm]

— TRACK OF INSERT POSITION 1
······· TRACK OF INSERT POSITION 2
----- TRACK OF INSERT POSITION 3
—·— TRACK OF INSERT POSITION 4
—··— TRACK OF INSERT POSITION 5
━━━ SHAPE OF CUT PLANE

FIG.30

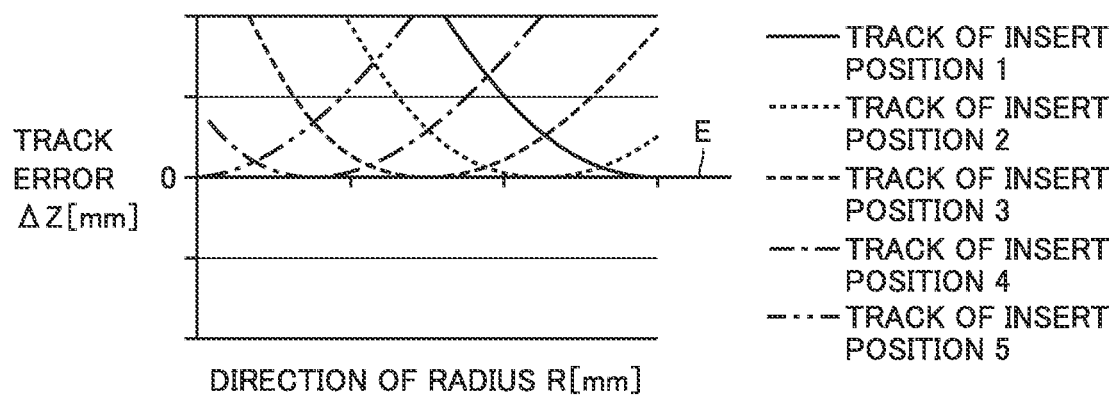

TRACK ERROR ΔZ[mm]

DIRECTION OF RADIUS R[mm]

— TRACK OF INSERT POSITION 1
······· TRACK OF INSERT POSITION 2
----- TRACK OF INSERT POSITION 3
—·— TRACK OF INSERT POSITION 4
—··— TRACK OF INSERT POSITION 5

US 10,543,537 B2

METHOD FOR MANUFACTURING MACHINE COMPONENT, APPARATUS FOR MANUFACTURING MACHINE COMPONENT, METHOD FOR MACHINING ROTATION SYMMETRY PLANE, RECORDING MEDIUM, AND PROGRAM

TECHNICAL FIELD

The present invention relates to a method for manufacturing a machine component, an apparatus for manufacturing a machine component, a method for machining a rotation symmetry plane, a recording medium having a program for a manufacturing method recorded thereon, and the program.

The present application claims priority to Japanese Patent Application No. 2015-177512 filed on Sep. 9, 2015, the entire contents of which are incorporated herein by reference.

BACKGROUND ART

International Publication No. 2001/043902 (PTD 1) discloses a method of machining a workpiece with a linear cutting edge. The cutting edge is set as being inclined with respect to a direction of feed and fed in a direction transverse to an axial line of rotation of the workpiece. With this machining method, a surface of the workpiece can be machined to be smooth and highly efficient machining can be achieved.

CITATION LIST

Patent Document

PTD 1: International Publication No. 2001/043902

SUMMARY OF INVENTION

A method for manufacturing a machine component according to one manner of the present invention is a method for manufacturing a machine component having a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining a track determines the track in accordance with a condition that (1) a first end portion of the cutting edge is positioned at a cutting start position of the rotation symmetry plane, (2) N (N being an integer not smaller than 2) regions defined by division of the cutting edge successively come in contact with the rotation symmetry plane, (3) a first inclination corresponding to an inclination of a tangent line at a point of cutting of each of the N regions is equal to a second inclination corresponding to a target inclination of a tangent line which passes through the point of cutting and comes in contact with the rotation symmetry plane in a cut plane of the rotation symmetry plane including the Z axis and the point of cutting, and (4) a second end portion of the cutting edge is positioned at a cutting end position of the rotation symmetry plane.

BRIEF DESCRIPTION OF DRAWINGS

FIG. 28 is a schematic diagram of a linear cutting edge.

FIG. 29 is a diagram showing a result of calculation of machining of a curved rotation plane with the linear cutting edge.

FIG. 30 is a diagram showing a track error in the direction of the Z axis based on the result of calculation shown in FIG. 29.

DESCRIPTION OF EMBODIMENTS

Figure 1:
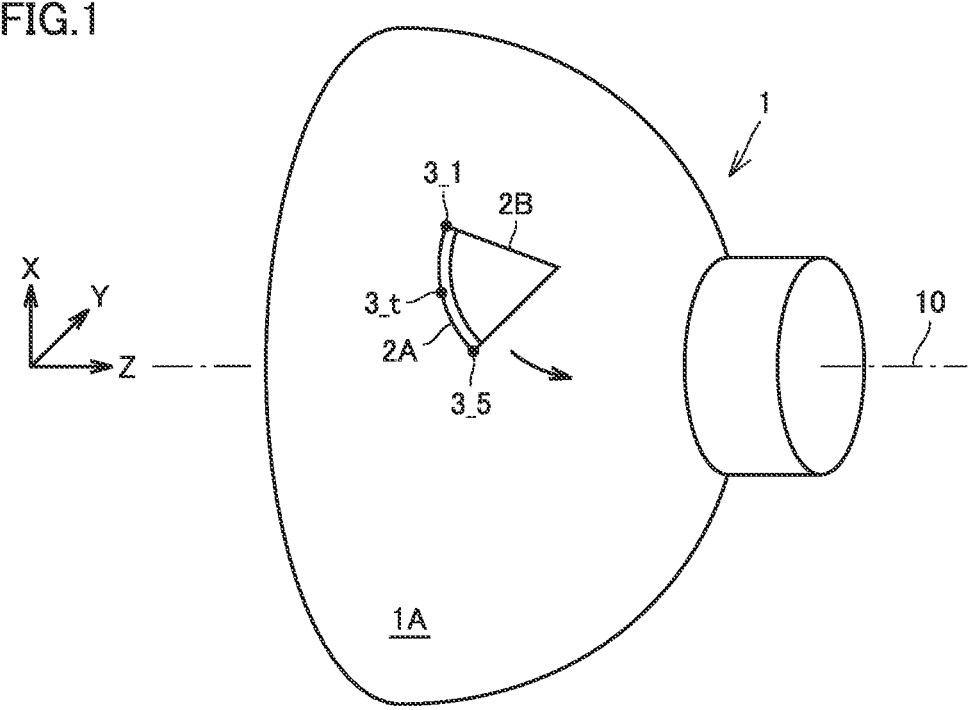
FIG. 1 is a perspective view showing a manufacturing method according to one embodiment of the present invention.

Problem to be Solved by the Present Disclosure

International Publication No. 2001/043902 discloses a side surface of a column as a rotation symmetry plane. The rotation symmetry plane, however, is not limited to the side surface of the column. There are explicit or potential needs for accurate machining of various rotation symmetry planes by cutting.

An object of the present disclosure is to provide a technique for accurately machining various rotation symmetry planes by cutting.

Effects of Present Disclosure

According to the present disclosure, various rotation symmetry planes can accurately be machined by cutting.

Description of Embodiments of the Present Invention

Embodiments of the present invention will initially be listed and described.

(1) A method for manufacturing a machine component according to one manner of the present invention is a method for manufacturing a machine component having a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining the track determines the track in accordance with a condition that (1) a first end portion of the cutting edge is positioned at a cutting start position of the rotation symmetry plane, (2) N (N being an integer not smaller than 2) regions defined by division of the cutting edge successively come in contact with the rotation symmetry plane, (3) a first inclination corresponding to an inclination of a tangent line at a point of cutting of each of the N regions is equal to a second inclination corresponding to a target inclination of a tangent line which passes through the point of cutting and comes in contact with the rotation symmetry plane in a cut plane of the rotation symmetry plane including the Z axis and the point of cutting, and (4) a second end portion of the cutting edge is positioned at a cutting end position of the rotation symmetry plane.

According to the above, a machine component having various rotation symmetry planes can highly accurately be machined. A linear or curved cutting edge is fed as being in contact with the point of cutting of the rotation symmetry plane. More specifically, the cutting edge is fed such that the N regions defined by division of the cutting edge successively come in contact with the rotation symmetry plane. As the rotation symmetry plane is machined with the entire cutting edge, accuracy in terms of surface roughness of the rotation symmetry plane (a machined surface) can be high. Namely, a smoother surface can be obtained. Furthermore, an inclination of the cutting edge at the point of cutting affects a radius of the machined rotation symmetry plane. When the first inclination deviates from the second inclination, the radius of the rotation symmetry plane will be different from a target value. Namely, a workpiece is excessively or insufficiently cut away. The plane including the Z axis and the point of cutting is a cut plane of the rotation symmetry plane (a cut plane of the machine component). The track of the cutting edge satisfies the condition that the inclination of the tangent line (the first inclination) at the point of cutting of each of the N regions of the cutting edge is equal to the target inclination (the second inclination) of the tangent line which passes through the point of cutting and comes in contact with the rotation symmetry plane on this plane. The cutting edge is fed along this track. Therefore, the rotation symmetry plane can be formed in conformity with a target shape.

The "first inclination being equal to the second inclination" is not limited to an example in which they are perfectly equal to each other but also encompasses an example in which the first inclination is substantially equal to the second inclination. "Substantially equal" encompasses, for example, a case that a difference between the first inclination and the second inclination is not greater than a minimum measurement value. When manufacturing tolerance has been set and when a difference between the first inclination and the second inclination is within the tolerance, the first inclination and the second inclination may be regarded as being substantially equal to each other.

(2) Preferably, the determining the track includes calculating a coordinate (X(t), Y(t), Z(t)) of the first end portion of the cutting edge in accordance with $$X(t) = (R_{sh}(t)\cos \phi(t) - X_{chip}(t))$$

$$Y(t) = (R_{sh}(t)\sin \phi(t) - Y_{chip}(t))$$

$$Z(t) = (Z_{sh}(t) - Z_{chip}(t)),$$

where a variable t assumes (N+1) values not smaller than 0 and not greater than 1. A coordinate (X(0), Y(0), Z(0)) represents a coordinate of the first end portion of the cutting edge positioned at the cutting start position and an origin of the three-dimensional orthogonal coordinate system. ($X_{chip}(t)$, $Y_{chip}(t)$, $Z_{chip}(t)$) represents a coordinate representing a position of the cutting edge in contact with the rotation symmetry plane at the point of cutting with the first end portion of the cutting edge being defined as a reference.

($X_{chip}(1)$, $Y_{chip}(1)$, $Z_{chip}(1)$) represents a coordinate of the second end portion of the cutting edge positioned at the cutting end position. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. $\phi(t)$ represents an angle formed by a straight line connecting the point of cutting projected on an XY plane and an origin of the XY plane to each other with respect to the X axis. $\phi(t)$ satisfies a condition of $\cos(\phi(t)+\beta(t))/\cos \beta(t)=\tan \theta(t)/\tan \theta_S(t)$ in order to set the first inclination of the cutting edge to be equal to the second inclination of the rotation symmetry plane. $\theta(t)$ represents an angle formed by an ith region in contact with the point of cutting of the N regions of the cutting edge with respect to the X axis when the ith region is projected on an XZ plane. $\beta(t)$ represents an angle formed by the ith region with respect to the X axis when the ith region is projected on the XY plane. $\theta_S(t)$ represents an angle representing the second inclination.

According to the above, the cutting edge can virtually be divided into N regions by using variable t. Furthermore, the rotation symmetry plane can virtually be divided into N regions corresponding to respective N regions of the cutting edge. Therefore, the track of the cutting edge can be determined such that each region of the cutting edge cuts the corresponding region of the rotation symmetry plane. Since the first end portion of the cutting edge is positioned at the cutting start position, the track of the first end portion of the cutting edge can express movement of the cutting edge from the cutting start position to the cutting end position. With movement of the cutting edge, a position of the point of cutting on the rotation symmetry plane is varied. The track of the first end portion of the cutting edge can be determined by a coordinate of the point of cutting ($R_{sh}(t)\cos \phi(t)$, $R_{sh}(t)\sin \phi(t)$, $Z_{sh}(t)$) and a relative coordinate ($X_{chip}(t)$, $Y_{chip}(t)$, $Z_{chip}(t)$) of the point of cutting with the first end portion of the cutting edge being defined as the reference.

(3) Preferably, the cutting edge is in a curved shape, and t is determined to divide a central angle determined in accordance with a radius of curvature of the curved shape into N equal parts.

According to the above, the track of the curved cutting edge can be determined.

(4) Preferably, the cutting edge is linear, and t is determined to divide a length of the cutting edge between the first end portion and the second end portion into N equal parts.

According to the above, the track of the linear cutting edge can be determined.

(5) An apparatus for manufacturing a machine component according to one manner of the present invention is an apparatus with which the method for manufacturing a machine component described in any of (1) to (4) above is performed.

According to the above, the rotation symmetry plane of the machine component can accurately be manufactured. Consequently, the machine component can accurately be manufactured.

(6) A machining method according to one manner of the present invention is a method of machining a rotation symmetry plane. The method includes machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining the track determines the track in accordance with a condition that (1) a first end portion of the cutting edge is positioned at a cutting start position of the rotation symmetry plane, (2) N (N being an integer not smaller than 2) regions defined by division of the cutting edge successively come in contact with the rotation symmetry plane, (3) a first inclination corresponding to an inclination of a tangent line at a point of cutting of each of the N regions is equal to a second inclination corresponding to a target inclination of a tangent line which passes through the point of cutting and comes in contact with the rotation symmetry plane in a cut plane of the rotation symmetry plane including the Z axis and the point of cutting, and (4) a second end portion of the cutting edge is positioned at a cutting end position of the rotation symmetry plane.

According to the above, a machine component having various rotation symmetry planes can highly accurately be machined.

(7) A recording medium according to one manner of the present invention is a computer readable recording medium having a program recorded thereon, the program being for manufacturing a machine component having a rotation symmetry plane. The program causes a computer to perform machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining the track includes calculating a coordinate (X(t), Y(t), Z(t)) of a first end portion of the cutting edge in accordance with $$X(t)=(R_{sh}(t)\cos \phi(t)-X_{chip}(t))$$

$$Y(t)=(R_{sh}(t)\sin \phi(t)-Y_{chip}(t))$$

$$Z(t)=(Z_{sh}(t)-Z_{chip}(t)),$$

where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. ($X_{chip}(t)$, $Y_{chip}(t)$, $Z_{chip}(t)$) represents a coordinate representing a position of the cutting edge in contact with the rotation symmetry plane at the point of cutting with the first end portion of the cutting edge being defined as a reference. ($X_{chip}(1)$, $Y_{chip}(1)$, $Z_{chip}(1)$) represents a coordinate of a second end portion of the cutting edge positioned at a cutting end position of the rotation symmetry plane. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. $\phi(t)$ represents an angle formed by a straight line connecting the point of cutting projected on an XY plane and an origin of the XY plane to each other with respect to the X axis. $\phi(t)$ satisfies a condition of $\cos(\phi(t)+\beta(t))/\cos \beta(t)=\tan \theta(t)/\tan \theta S(t)$ in order to set a first inclination corresponding to an inclination of a tangent line at the point of cutting of each of the N regions to be equal to a second inclination corresponding to a target inclination of a tangent line which passes through the point of cutting and comes in contact with the rotation symmetry plane in a cut plane of the rotation symmetry plane. θ(t) represents an angle formed by an ith region in contact with the point of cutting of the N regions of the cutting edge with respect to the X axis when the ith region is projected on an XZ plane. β(t) represents an angle formed by the ith region with respect to the X axis when the ith region is projected on the XY plane. $\theta_S(t)$ represents an angle representing the second inclination.

According to the above, a machine component having various rotation symmetry planes can highly accurately be machined.

(8) A program according to one manner of the present invention is a program for manufacturing a machine component having a rotation symmetry plane. The program causes a computer to perform machining the rotation symmetry plane by feeding a linear or curved cutting edge while the cutting edge is in contact with a point of cutting of the rotation symmetry plane. The machining the rotation symmetry plane includes determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis and feeding the cutting edge along the track. The determining the track includes calculating a coordinate (X(t), Y(t), Z(t)) of a first end portion of the cutting edge in accordance with $$X(t)=(R_{sh}(t)\cos \phi(t)-X_{chip}(t))$$

$$Y(t)=(R_{sh}(t)\sin \phi(t)-Y_{chip}(t))$$

$$Z(t)=(Z_{sh}(t)-Z_{chip}(t)),$$

where a variable t assumes (N+1) values not smaller than 0 and not greater than 1. A coordinate (X(0), Y(0), Z(0)) represents a coordinate of the first end portion of the cutting edge positioned at a cutting start position of the rotation symmetry plane and an origin of the three-dimensional orthogonal coordinate system. ($X_{chip}(t)$, $Y_{chip}(t)$, $Z_{chip}(t)$) represents a coordinate representing a position of the cutting edge in contact with the rotation symmetry plane at the point of cutting with the first end portion of the cutting edge being defined as a reference. ($X_{chip}(1)$, $Y_{chip}(1)$, $Z_{chip}(1)$) represents a coordinate of a second end portion of the cutting edge positioned at a cutting end position of the rotation symmetry plane. $R_{sh}(t)$ represents a radius of the rotation symmetry plane corresponding to a distance from a center of rotation on the Z axis to the point of cutting. $Z_{sh}(t)$ represents a coordinate on the Z axis of the center of rotation. φ(t) represents an angle formed by a straight line connecting the point of cutting projected on an XY plane and an origin of the XY plane to each other with respect to the X axis. φ(t) satisfies a condition of cos(φ(t)+β(t))/cos β(t)=tan θ(0/tan $\theta_S(t)$ in order to set a first inclination corresponding to an inclination of a tangent line at the point of cutting of each of the N regions to be equal to a second inclination corresponding to a target inclination of a tangent line which passes through the point of cutting and comes in contact with the rotation symmetry plane in a cut plane of the rotation symmetry plane. θ(t) represents an angle formed by an ith region in contact with the point of cutting of the N regions of the cutting edge with respect to the X axis when the ith region is projected on an XZ plane. β(t) represents an angle formed by the ith region with respect to the X axis when the ith region is projected on the XY plane. $\theta_S(t)$ represents an angle representing the second inclination. According to the above, a machine component having various rotation symmetry planes can highly accurately be machined.

Details of Embodiments of the Present Invention

Embodiments of the present invention will be described hereinafter with reference to the drawings. The same or corresponding elements in the drawings below have the same reference characters allotted and description thereof will not be repeated. For better understanding of the description, only some of constituent elements of the invention may be shown in the drawings.

FIG. 1 is a perspective view showing a manufacturing method according to one embodiment of the present invention. As shown in FIG. 1, a machine component 1 having a rotation symmetry plane (machined surface) 1A rotates around an axial line of rotation 10. Machine component 1 is a product manufactured with the manufacturing method according to one embodiment of the present invention.

FIG. 1 shows a machining step representing one step in the manufacturing method according to one embodiment of the present invention. Therefore, in the step shown in FIG. 1, machine component 1 can also be called a workpiece. The machining step includes cutting. The manufacturing method according to one embodiment of the present invention may include other steps. The manufacturing method can include, for example, a casting step, an assembly step, and an inspection step.

In the manufacturing method according to one embodiment of the present invention, feed of a cutting edge 2A is controlled in accordance with a three-dimensional orthogonal coordinate system. In FIG. 1, a Z axis corresponds to axial line of rotation 10. An X axis and a Y axis are both perpendicular to the Z axis and perpendicular to each other. The X axis can be set to a direction determining a dimension of a diameter or a radius of the rotation symmetry plane, which is also referred to as a radial direction or a direction of edge feed in cutting and machining. The Y axis is an axis orthogonal to both of the X axis and the Z axis and called, for example, a lateral direction or a direction of rotation. For example, axes defined as the X axis, the Y axis, and the Z axis in a lathe can be applied to the X axis, the Y axis, and the Z axis in the embodiment of the present invention.

In this embodiment, the direction of the Z axis is defined as a direction of feed (vertical feed) of cutting edge 2A. A negative direction of the X axis is defined as a direction of cut into machine component 1. The direction of the Y axis is defined as a direction opposite to a direction of movement of cutting edge 2A for cutting.

Cutting edge 2A is a part of a cutting insert 2B. Cutting insert 2B is attachable to and removable from a holder (tool). FIG. 1 does not show a holder. When it is not necessary to distinguish between cutting edge 2A and cutting insert 2B, both of them are collectively referred to as the "cutting edge" below.

Cutting edge 2A is fed along a track having an X-axis component, a Y-axis component, and a Z-axis component while it is in contact with machine component 1. During a period from start of cutting to end of cutting, individual regions of cutting edge 2A from a tip end 3_1 to a rear end 3_5 successively come in contact with a surface to be machined (rotation symmetry plane 1A). A position in rotation symmetry plane 1A where cutting edge 2A is in contact therewith is called a "point of cutting" below. In FIG. 1, a point 3_t represents a position of cutting edge 2A in contact with the point of cutting of rotation symmetry plane 1A. Rotation symmetry plane 1A is formed by movement of cutting edge 2A.

A type of rotation symmetry plane 1A is not particularly limited in this embodiment. Rotation symmetry plane 1A can be determined by a line which rotates around axial line of rotation 10. This line is called a "generating line" in the present embodiment. In a cross-section of machine component 1 including axial line of rotation 10, the generating line corresponds to a line expressing a portion corresponding to rotation symmetry plane 1A.

The generating line of rotation symmetry plane 1A may be linear. In other words, rotation symmetry plane 1A may be a side surface of a column or a surface of a frustum. A rotation symmetry plane of which generating line is linear like the surface of the frustum or the side surface of the column is referred to as a "linear rotation plane" below.

Alternatively, the generating line of rotation symmetry plane 1A may be any curve including an arc. FIG. 1 and figures explained below show examples in which the generating line of the rotation symmetry plane is curved. The rotation symmetry plane of which generating line is any curve including an arc is referred to as a "curved rotation plane" below.

A type of machine component 1 is not particularly limited. In one embodiment, machine component 1 is a component in a drive system of a car. For example, a pulley for constructing a continuously variable transmission represents machine component 1.

Figure 2:
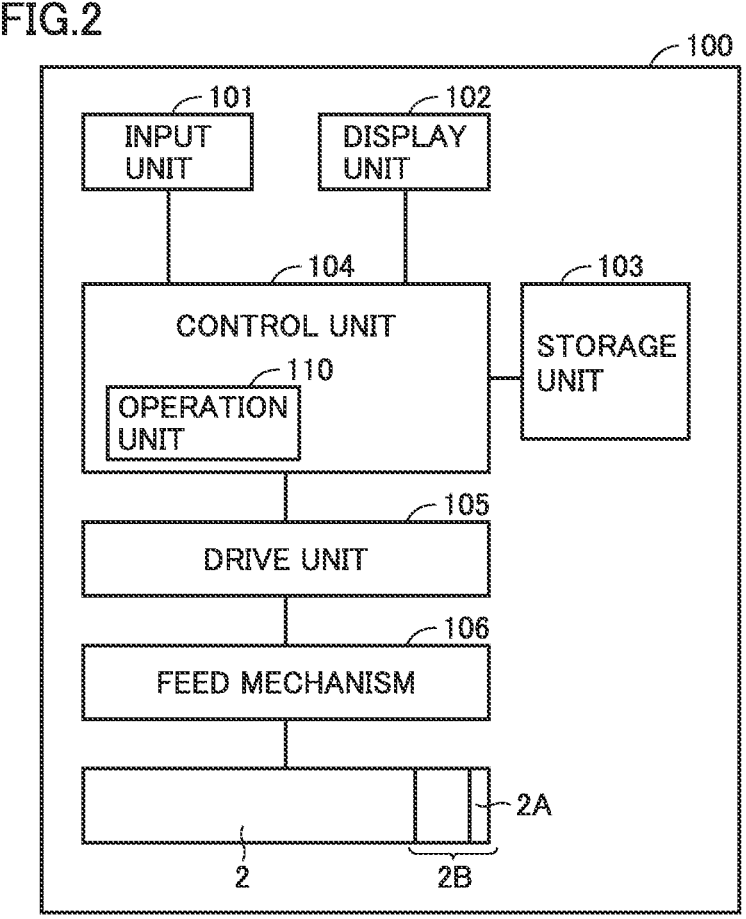
FIG. 2 is a block diagram schematically showing a configuration of a manufacturing apparatus according to one embodiment of the present invention.

FIG. 2 is a block diagram schematically showing a configuration of a manufacturing apparatus according to one embodiment of the present invention. A manufacturing apparatus 100 according to one embodiment of the present invention can be implemented, for example, by a computer numerical control (CNC) lathe. As shown in FIG. 2, manufacturing apparatus 100 includes an input unit 101, a display unit 102, a storage unit 103, a control unit 104, a drive unit 105, a feed mechanism 106, holder 2, and cutting insert 2B having cutting edge 2A.

Input unit 101 is operated by a user. Input unit 101 accepts information from the user and sends the information to control unit 104. The information from the user includes information on a program selected by the user, various types of data necessary for manufacturing machine component 1 (machining of a rotation symmetry plane), and a command from the user.

Display unit 102 shows characters, signs, and graphics. Display unit 102 can show information accepted by input unit 101 and a result of operation by control unit 104.

Storage unit 103 stores information accepted by input unit 101 and a program for manufacturing machine component 1. The program includes a program for machining a rotation symmetry plane. According to one embodiment, storage unit 103 is implemented by a rewritable non-volatile storage device. Therefore, storage unit 103 corresponds to a recording medium having a program recorded thereon. The program may be provided through a communication line. In this case as well, the program is stored in storage unit 103.

Control unit 104 is implemented by a computer configured to control manufacturing apparatus 100 in a centralized manner. Control unit 104 includes an operation unit 110. Operation unit 110 performs numeric operations based on information accepted by input unit 101 and information stored in storage unit 103. For example, operation unit 110 may be embodied as a result of execution of a program by a central processing unit (CPU).

Drive unit 105 drives feed mechanism 106. Drive unit 105 is controlled by control unit 104. Feed mechanism 106 is configured to be able to feed holder 2 in the direction of the X axis, the direction of the Y axis, and the direction of the Z axis.

Holder 2 holds cutting edge 2A by holding cutting insert 2B. Holder 2 is attached to feed mechanism 106. During machining of rotation symmetry plane 1A by cutting edge 2A, holder 2 is fixed to feed mechanism 106 so as not to be rotatable around an axis of rotation. Therefore, during machining of rotation symmetry plane 1A, holder 2 holds an angle of cutting edge 2A. During a period other than machining of rotation symmetry plane 1A (by way of example, during maintenance of manufacturing apparatus 100), holder 2 can rotate around the axis of rotation. Thus, maintenance of manufacturing apparatus 100 is advantageously facilitated.

Cutting edge 2A is formed by a ridgeline between a rake face and a flank of cutting insert 2B. In one embodiment of the present invention, the ridgeline is curved. Namely, cutting edge 2A is curved. In one example, cutting edge 2A is in an arc shape.

In the example shown in FIG. 1, cutting edge 2A is projecting toward rotation symmetry plane 1A. Cutting edge 2A, however, may be recessed. A shape of cutting edge 2A can be determined such that cutting edge 2A does not interfere with an already machined portion of rotation symmetry plane 1A.

In another embodiment of the present invention, cutting edge 2A may be linear. The term "linear" herein means that a shape of cutting edge 2A is linear. A shape of cutting insert 2B for implementing the linear cutting edge is not particularly limited. In one embodiment, cutting insert 2B is in a triangular shape.

According to the embodiment of the present invention, individual regions of cutting edge 2A successively come in contact with rotation symmetry plane 1A during a period from start of cutting until end of cutting regardless of a shape of cutting edge 2A. With such machining, wear is distributed over the entire cutting edge 2A. Therefore, a lifetime of cutting edge 2A can be extended.

Figure 3:
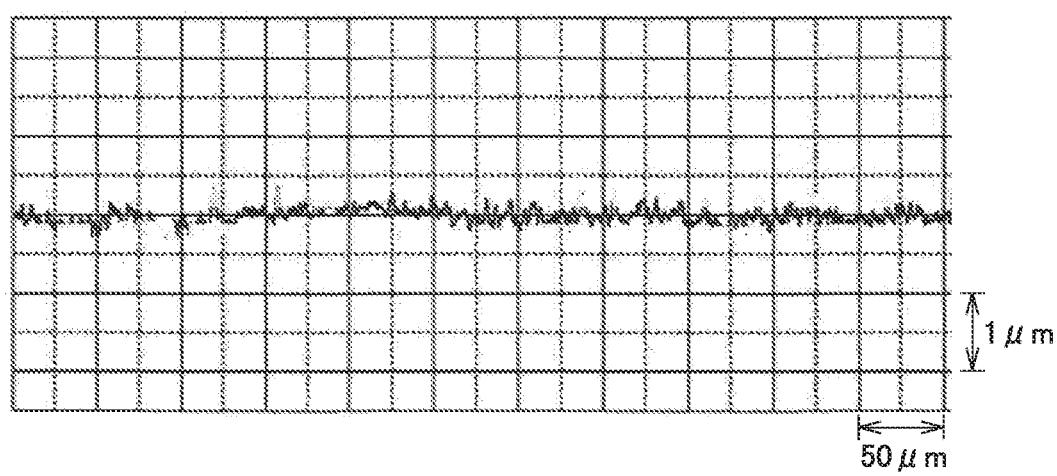
FIG. 3 is a graph showing surface roughness of a surface cut and machined in accordance with the manufacturing method according to an embodiment of the present invention.

FIG. 3 is a graph showing surface roughness of a surface cut and machined in accordance with the manufacturing method according to an embodiment of the present invention. FIG. 3 shows one example of a result of machining of a side surface of a column with linear cutting edge 2A. A cutting method of feeding the cutting edge while the same portion of the cutting edge is brought in contact with a machined surface is available (point cutting). In point cutting, a coordinate of the cutting edge on the X axis is varied while the cutting edge is fed in the direction of the Z axis. Rotation symmetry planes in various shapes can thus be formed. Point cutting is advantageous in that a contact resistance of the cutting edge is low. A helical trace is likely to be formed in the machined surface. The manufacturing method according to the embodiment of the present invention can enhance accuracy (surface roughness) of the machined surface while a rate of feed of the cutting edge is increased, by using the entire cutting edge. Therefore, a smoother surface can be formed.

The manufacturing method according to the embodiment of the present invention, in particular, machining of a rotation symmetry plane, will be described in detail below.

1. Overview

Figure 4:
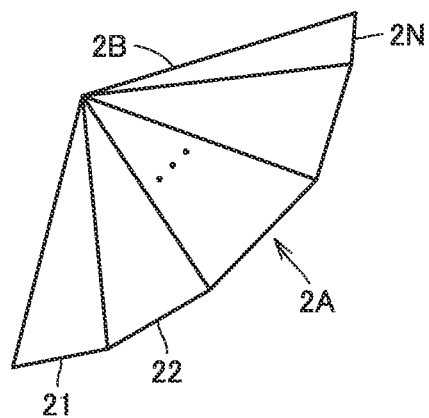
FIG. 4 is a schematic diagram of a cutting edge used in a machining method according to this embodiment.
Figure 5:
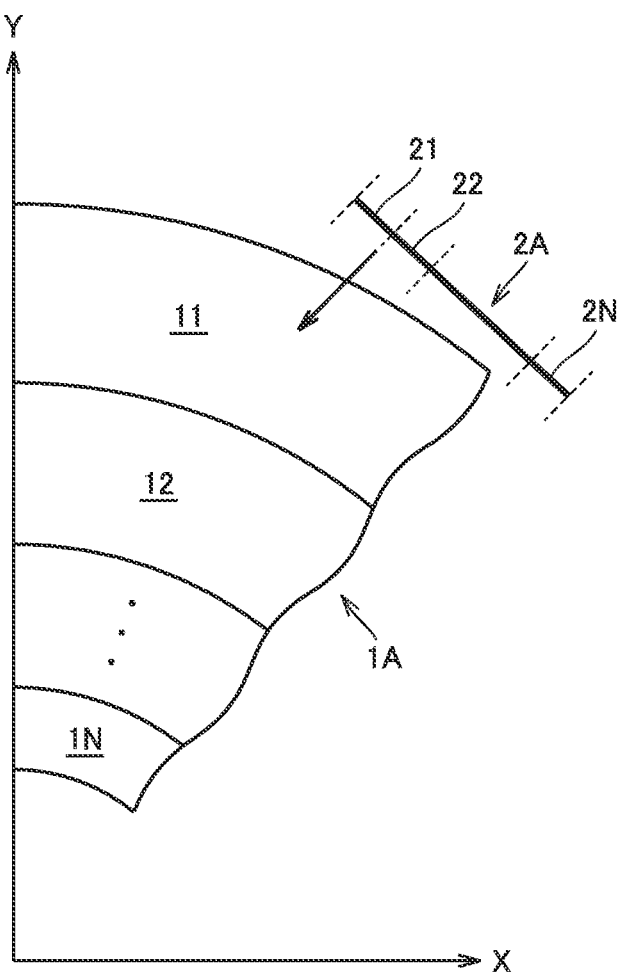
FIG. 5 is a schematic plan view of a rotation symmetry plane machined with the machining method according to this embodiment.

FIG. 4 is a schematic diagram of a cutting edge used in a machining method according to this embodiment. FIG. 5 is a schematic plan view of a rotation symmetry plane machined with the machining method according to this embodiment.

Referring to FIGS. 4 and 5, cutting edge 2A of cutting insert 2B is virtually divided into N (N being an integer not smaller than 2) regions. The N regions are referred to as edges 21, 22, . . . , and 2N. Each of edges 21, 22, . . . , and 2N is linear. When cutting edge 2A is curved, the shape of cutting edge 2A is approximated by N line segments.

N edges 21, 22, . . . , and 2N successively come in contact with rotation symmetry plane 1A. Rotation symmetry plane 1A is virtually divided into regions 11, 12, . . . , and 1N. An ith (i being an integer from 1 to N) edge of N edges cuts an ith region of the N regions.

Rotation symmetry plane 1A is machined with the entire cutting edge 2A. A part of cutting edge 2A can be prevented from being significantly worn as compared with other portions. Therefore, a lifetime of the insert can be longer. Furthermore, since rotation symmetry plane 1A is machined with the entire cutting edge 2A, accuracy of the machined surface can be higher (see FIG. 3).

2. Track of Cutting Edge (1) Use of Entire Cutting Edge

A track of cutting edge 2A is expressed with an XYZ coordinate system. A direction of each of the X axis, the Y axis, and the Z axis is defined as shown in FIG. 1.

Figure 6:
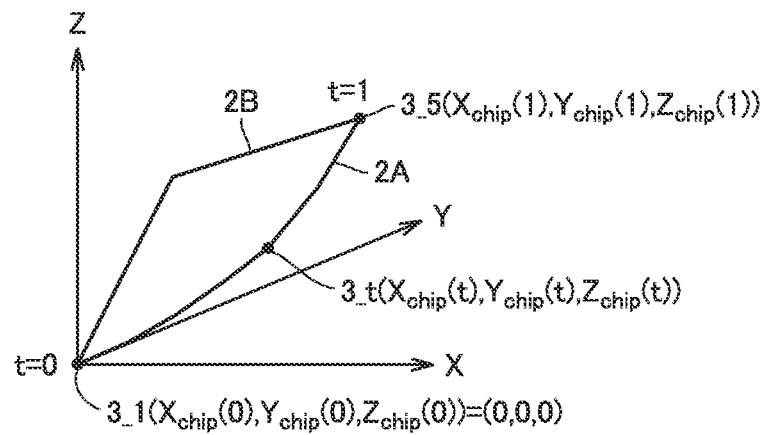
FIG. 6 is a diagram for illustrating a coordinate of the cutting edge.

FIG. 6 is a diagram for illustrating a coordinate of the cutting edge. Referring to FIG. 6, variable t is introduced. Variable t is a variable for expressing a degree of progress of cutting of a rotation symmetry plane by cutting edge 2A. Variable t is hereinafter referred to as a "cutting progress degree t." Cutting progress degree t assumes (N+1) values not smaller than 0 and not greater than 1. t=0 means start of cutting of a rotation symmetry plane. t=1 means end of cutting of the rotation symmetry plane. As shown in FIGS. 4 and 5, N edges 21, 22, . . . , and 2N successively come in contact with rotation symmetry plane 1A. Therefore, a position of point 3_t is varied in accordance with cutting progress degree t.

A coordinate of point 3_t is expressed as $(X_{chip}(t), Y_{chip}(t), Z_{chip}(t))$. $(X_{chip}(t), Y_{chip}(0, Z_{chip}(t))$ represents a relative coordinate with a position of tip end 3_1 of cutting edge 2A being defined as the reference. The coordinate $(X_{chip}(t), Y_{chip}(t), Z_{chip}(t))$ is dependent on a shape of cutting edge 2A, an angle of attachment of cutting edge 2A, and an angle of holder 2. The angle of attachment of cutting edge 2A corresponds to an inclination of cutting edge 2A with respect to the X axis when cutting edge 2A is projected on the XZ plane. The angle of holder 2 corresponds to an inclination of cutting edge 2A with respect to the X axis when cutting edge 2A is projected on the XY plane.

During cutting and machining, rotation of cutting insert 2B is suppressed by holder 2. Therefore, while cutting progress degree t is varied from 0 to 1, a function representing each of $X_{chip}(t)$, $Y_{chip}(t)$, and $Z_{chip}(t)$ is not varied.

Figure 7:
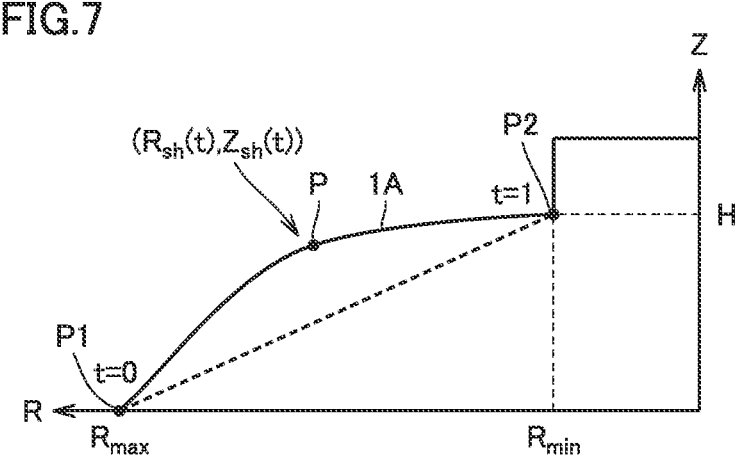
FIG. 7 is a diagram for illustrating the rotation symmetry plane machined with the cutting edge.

FIG. 7 is a diagram for illustrating the rotation symmetry plane machined with the cutting edge. Referring to FIG. 7, an R axis is an axis in a radial direction of the rotation symmetry plane. The R axis is orthogonal to the Z axis. As shown in FIG. 7, rotation symmetry plane 1A is expressed with a line on an RZ plane. This line may be any of a straight line and a curve depending on a rotation symmetry plane.

In this embodiment, cutting and machining is performed from an outer end of rotation symmetry plane 1A toward an inner end of the rotation symmetry plane.

With movement of cutting edge 2A, a position of a point of cutting P is varied. Therefore, a coordinate of point of cutting P can be expressed as a function dependent on cutting progress degree t.

A coordinate of point of cutting P is expressed as $(R_{sh}(t), Z_{sh}(t))$. $R_{sh}(t)$ represents a radius of rotation symmetry plane 1A corresponding to a distance from the center of rotation on the Z axis to point of cutting P. $Z_{sh}(t)$ represents a Z-axis coordinate of the center of rotation. Function $R_{sh}(t)$ and function $Z_{sh}(t)$ can properly be determined in accordance with rotation symmetry planes of various shapes.

When a condition of t=0 is satisfied, point of cutting P is positioned at a cutting start position P1. A radius of the rotation symmetry plane at cutting start position P1 is denoted as $R_{max}$. The Z-axis coordinate of cutting start position P1 is defined as 0. Namely, a condition of $(R_{sh}(0), Z_{sh}(0))=(R_{max}, 0)$ is satisfied. $R_{max}$ assumes a predetermined value.

When a condition of t=1 is satisfied, point of cutting P is positioned at a cutting end position P2. A radius of the rotation symmetry plane at cutting end position P2 is denoted as $R_{min}$. A Z-axis coordinate of cutting end position P2 is denoted as H. Namely, a condition of $(R_{sh}(1), Z_{sh}(1)) = (R_{min}, H)$ is satisfied. $R_{min}$ and H both assume a predetermined value.

Figure 8:
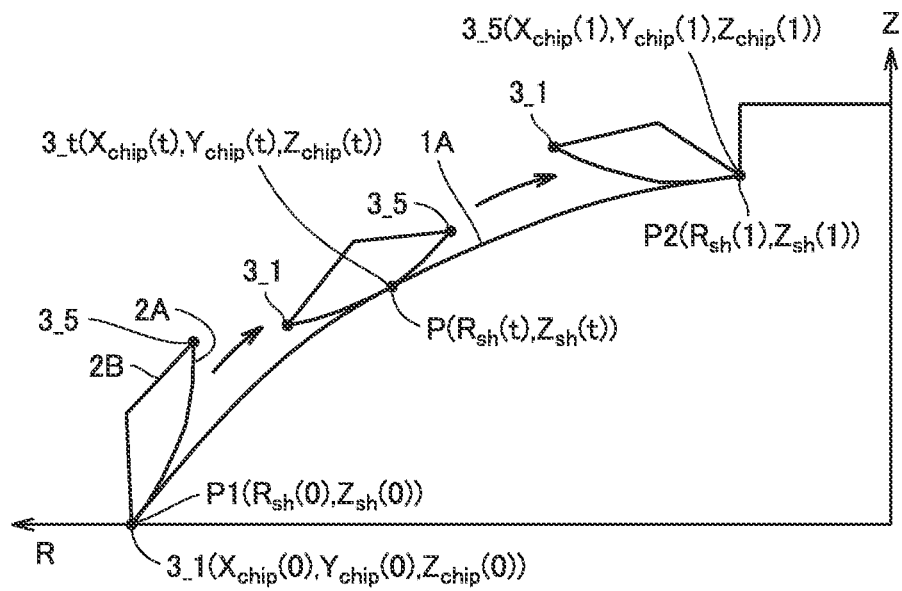
FIG. 8 is a diagram showing the cutting edge which moves as being in contact with the rotation symmetry plane.

FIG. 8 is a diagram showing the cutting edge which moves as being in contact with the rotation symmetry plane. As shown in FIG. 8, cutting edge 2A is fed while it is in contact with point of cutting P of rotation symmetry plane 1A.

When a condition of t=0 is satisfied, tip end 3_1 (first end portion) of cutting edge 2A is positioned at cutting start position P1 of rotation symmetry plane 1A. A position of point 3_t on cutting edge 2A is the same as the position of tip end 3_1 of cutting edge 2A.

When a condition of t=1 is satisfied, rear end 3_5 (second end portion) of cutting edge 2A is positioned at cutting end position P2. A position of point 3_t on cutting edge 2A is the same as the position of rear end 3_5 (second end portion) of cutting edge 2A.

As shown in FIGS. 6 and 8, a coordinate of tip end 3_1 of cutting edge 2A when the condition of t=0 is satisfied can be expressed as $(X_{chip}(0), Y_{chip}(0), Z_{chip}(0))$. On the track of cutting edge 2A, $(X_{chip}(0), Y_{chip}(0), Z_{chip}(0))$ is defined as the origin of the XYZ coordinate system. The coordinate of cutting start position P1 is expressed as $(R_{sh}(0), Z_{sh}(0))$ A coordinate of rear end 3_5 of cutting edge 2A when the condition of t=1 is satisfied can be expressed as $(X_{chip}(1), Y_{chip}(1), Z_{chip}(1))$. A coordinate of cutting end position P2 is expressed as $(R_{sh}(1), Z_{sh}(1))$.

Generally, the coordinate of point 3_t on cutting edge 2A is expressed as $(X_{chip}(t), Y_{chip}(t), Z_{chip}(t))$. Cutting edge 2A is in contact with point of cutting P on rotation symmetry plane 1A at point 3_t. The coordinate of point of cutting P is expressed as $(R_{sh}(t), Z_{sh}(t))$. $Z_{chip}(t)$ and 440, however, are different from each other. The reason is that Z-axis coordinate $Z_{chip}(t)$ of point 3_t is expressed as a relative coordinate, with a Z coordinate of tip end 3_1 of cutting edge 2A being defined as the reference.

(2) Condition for Machining of Rotation Symmetry Plane

Figure 9:
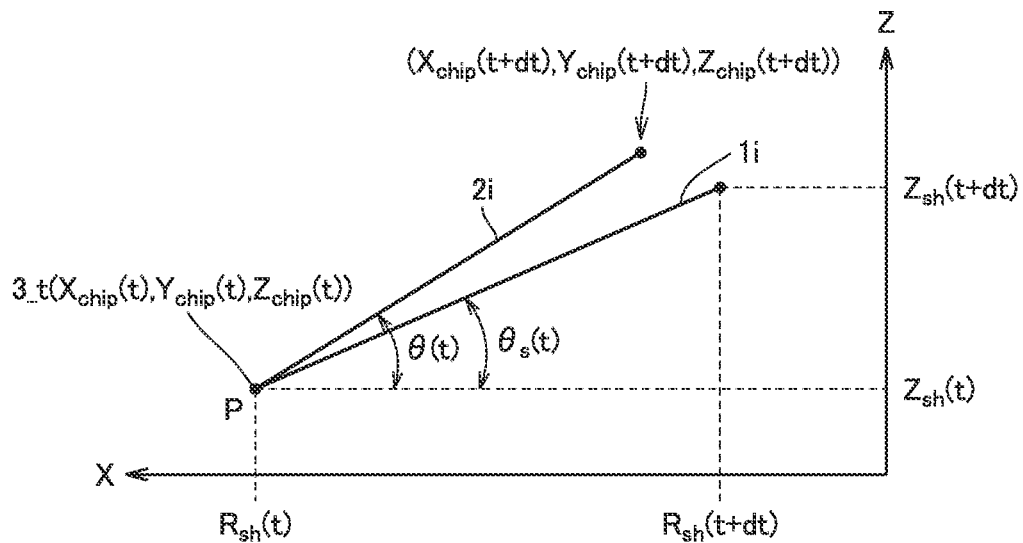
FIG. 9 is a model diagram in which the rotation symmetry plane and the cutting edge in the vicinity of a position where the rotation symmetry plane and the cutting edge are in contact with each other are expressed on an XZ plane.
Figure 10:
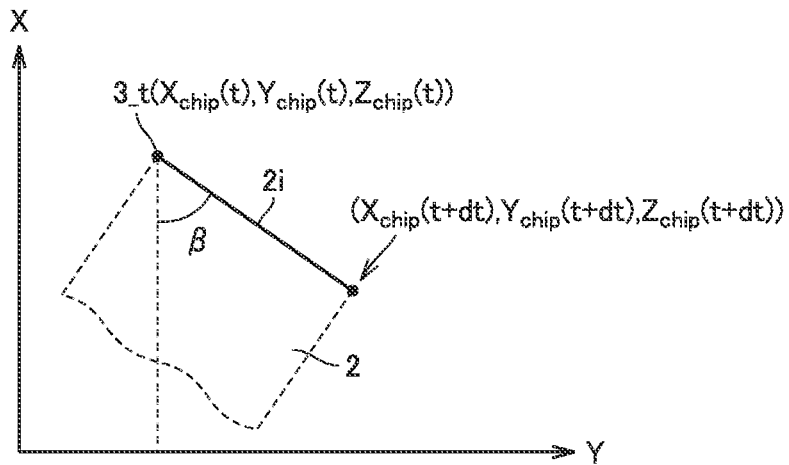
FIG. 10 is a model diagram in which the rotation symmetry plane and the cutting edge in the vicinity of the position where the rotation symmetry plane and the cutting edge are in contact with each other are expressed on an XY plane.

FIG. 9 is a model diagram in which rotation symmetry plane 1A and cutting edge 2A in the vicinity of a position where rotation symmetry plane 1A and cutting edge 2A are in contact with each other are expressed on the XZ plane. FIG. 10 is a model diagram in which rotation symmetry plane 1A and cutting edge 2A in the vicinity of the position where rotation symmetry plane 1A and cutting edge 2A are in contact with each other are expressed on the XY plane.

Referring to FIGS. 9 and 10, an edge 2i is the ith edge of the N edges of cutting edge 2A. A region 1i is the ith region of the N regions of rotation symmetry plane 1A. Edge 2i comes in contact with region 1i at point of cutting P. A position on edge 2i in contact with region 1i is expressed by point 3_t.

An angle $\theta_S(t)$ represents an inclination of region 1i projected on the XZ plane. Specifically, angle $\theta_S(t)$ is an angle representing an inclination of a tangent line which passes through point of cutting P and is in contact with region 1i projected on the XZ plane. The inclination of the tangent line corresponds to a ratio of a rate of change in the direction of the Z axis to a rate of change in the direction of the X axis. Therefore, angle $\theta_S(t)$ can be expressed in accordance with an expression below, where dt represents a rate of change in cutting progress degree t.

$$\tan\theta_s(t) = -\frac{Z_{sh}(t+dt) - Z_{sh}(t)}{R_{sh}(t+dt) - R_{sh}(t)} = -\frac{dZ_{sh}}{dt}\left(\frac{dR_{sh}}{dt}\right)^{-1} \quad (1)$$

Angle $\theta(t)$ represents an inclination of edge 2i projected on the XZ plane with respect to the X axis. Specifically, angle $\theta(t)$ represents an inclination of a tangent line which passes through point 3_t and is in contact with edge 2i projected on the XZ plane. Angle $\theta(t)$ can be expressed in accordance with an expression below.

$$\tan\theta(t) = -\frac{dZ_{chip}(t+dt) - dZ_{chip}(t)}{dX_{chip}(t+dt) - dX_{chip}(t)} = -\frac{dZ_{chip}}{dt}\left(\frac{dX_{chip}}{dt}\right)^{-1} \quad (2)$$

An angle $\beta(t)$ of holder 2 can be expressed as an angle of a tangent line which passes through point 3_t and is in contact with edge 2i projected on the XY plane. Angle $\beta(t)$ can also be defined as an angle of edge 2i. Angle $\beta(t)$ can be expressed in accordance with an expression below.

$$\tan\beta(t) = -\frac{dY_{chip}(t+dt) - dY_{chip}(t)}{dX_{chip}(t+dt) - dX_{chip}(t)} = -\frac{dY_{chip}}{dt}\left(\frac{dX_{chip}}{dt}\right)^{-1} \quad (3)$$

Figure 11:
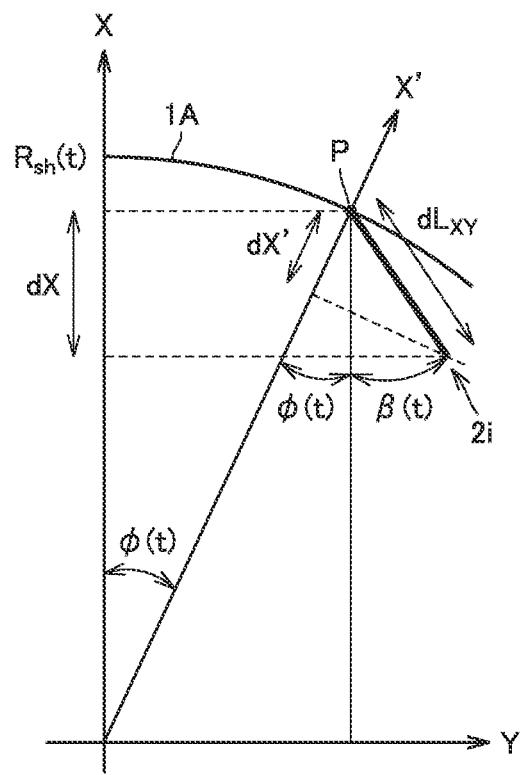
FIG. 11 is a diagram for illustrating an X-axis coordinate and a Y-axis coordinate of a point of cutting.

FIG. 11 is a diagram for illustrating an X-axis coordinate and a Y-axis coordinate of point of cutting P. Referring to FIG. 11, when point of cutting P is projected on the XY plane, point of cutting P is located on a circumference having radius $R_{sh}(t)$ with the origin being defined as the center. An X' axis is an axis which connects the origin and point of cutting P to each other in the XY plane.

An angle of cutting $\phi(t)$ represents an angle formed by the X' axis with respect to the X axis on the XY plane. Angle of cutting $\phi(t)$ is dependent on t. With variation of t from 0 to 1, the X' axis pivots within the XY plane around the origin.

A length of edge 2i projected on the XY plane is denoted as $dL_{XY}$. When edge 2i is projected on the XY plane, edge 2i is inclined with respect to the X axis by angle $\beta(t)$. A length of edge 2i in the direction of the X axis, a length thereof in the direction of the Z axis, and a length thereof in the direction of the X' axis are denoted by dX, dZ, and dX', respectively. dX, dZ, and dX' can be expressed with $dL_{XY}$ in accordance with expressions below.

$$dX = dL_{XY} \cos\beta(t) \quad (4)$$

$$dZ = dX \tan\theta(t) \quad (5)$$

$$dX' = dL_{XY} \cos(\phi(t) + \beta(t)) \quad (6)$$

Figure 12:
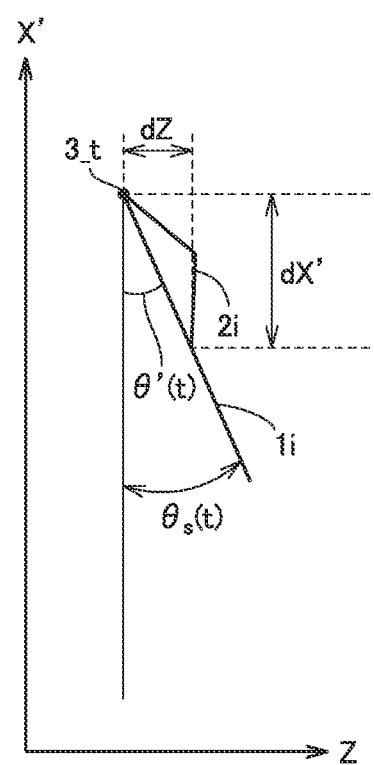
FIG. 12 is a diagram for illustrating the cutting edge projected on an X'Z plane.

FIG. 12 is a diagram for illustrating the cutting edge projected on an X'Z plane. Referring to FIG. 12, the X'Z plane is a plane including the Z axis and point of cutting P and it corresponds to a cut plane of rotation symmetry plane 1A (a cut plane of machine component 1). An angle formed by edge 2i projected on the X'Z plane with respect to the X' axis is denoted as $\theta'(t)$. Relation below is satisfied for angle $\theta'(4$ $$\frac{dZ}{dX'} = -\tan\theta'(t) \quad (7)$$

In order to machine rotation symmetry plane 1A to a target shape, edge 2i should be fed such that an inclination of rotation symmetry plane 1A at point of cutting P attains to a target inclination (angle $\theta_S(t)$) on the cut plane (the X'Z plane). Edge 2i is linear. By feeding edge 2i, an inclination of machined rotation symmetry plane 1A reflects the inclination of edge 2i. Therefore, on the cut plane, the inclination of edge 2i at point of cutting P should be equal to the target inclination of rotation symmetry plane 1A at point of cutting P. Namely, relation of $\theta'(t) = \theta_S(t)$ is satisfied.

An expression below is derived from the expression (7) and relation of $\theta'(t) = \theta_S(t)$.

$$\frac{dZ}{dX'} = -\frac{dL_{XY}\cos\beta(t)}{dL_{XY}\cos(\phi(t) + \beta(t))}\tan\theta(t) = -\tan\theta'(t) = -\tan\theta_s(t) \quad (8)$$

An expression below is derived by transforming the expression above.

$$\frac{\cos(\phi(t) + \beta(t))}{\cos\beta(t)} = \frac{\tan\theta(t)}{\tan\theta_s(t)} \quad (9)$$

Angle of cutting $\phi(t)$ is determined to satisfy the relation above while t is varied from 0 to 1. Thus, such a state that the inclination (first inclination) of the tangent line of the cutting edge at point of cutting P is equal to the target inclination (second inclination) of rotation symmetry plane 1A at point of cutting P in the cut plane (X'Z plane) of rotation symmetry plane 1A during a period from start of cutting until end of cutting is maintained.

As set forth above, cutting edge 2A is virtually divided into N linear edges. Therefore, the inclination of the tangent line of the cutting edge at point of cutting P can be substituted with the inclination of the cutting edge (edge 2i) at point of cutting P.

Figure 13:
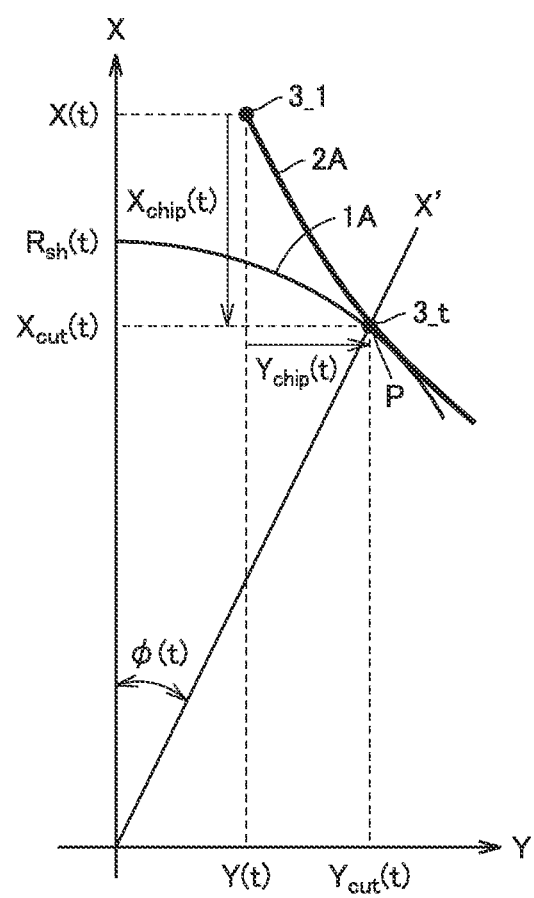
FIG. 13 is an XY plane diagram for illustrating relation between the point of cutting on the rotation symmetry plane and a tip end of the cutting edge.

FIG. 13 is an XY plane diagram for illustrating relation between the point of cutting on the rotation symmetry plane and the tip end of the cutting edge. Referring to FIG. 13, a distance from the origin to point of cutting P on the X' axis is expressed as $R_{sh}(t)$. The X' axis forms angle $\phi(t)$ with respect to the X axis.

Figure 14:
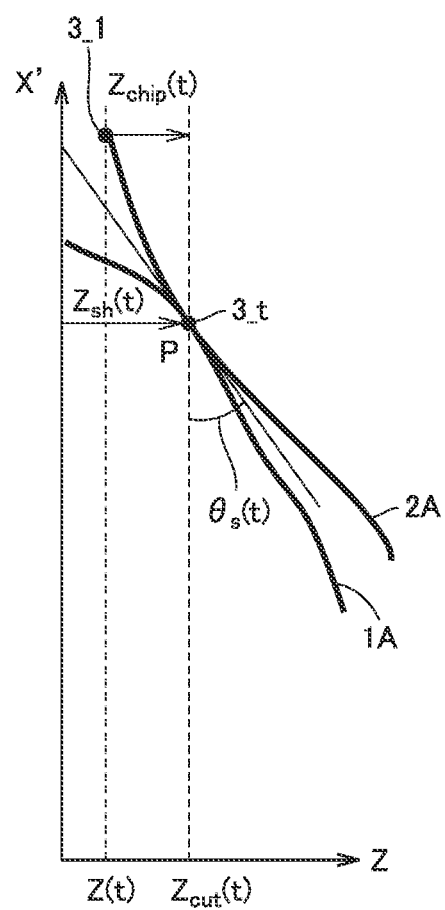
FIG. 14 is an X'Z plane diagram for illustrating relation between the point of cutting on the rotation symmetry plane and the tip end of the cutting edge.

FIG. 14 is an X'Z plane diagram for illustrating relation between the point of cutting on the rotation symmetry plane and the tip end of the cutting edge. Referring to FIG. 14, a Z-axis coordinate of point of cutting P is expressed as $Z_{sh}(t)$.

A three-dimensional coordinate ($X_{cut}(t)$, $Y_{cut}(t)$, $Z_{cut}(t)$) of point of cutting P can be expressed in accordance with expressions below.

$$X_{cut}(t)=R_{sh}(t)\cos\phi(t) \quad (10)$$

$$Y_{cut}(t)=R_{sh}(t)\sin\phi(t) \quad (11)$$

$$Z_{cut}(t)=Z_{sh}(t) \quad (12)$$

A coordinate of tip end 3_1 of cutting edge 2A can be expressed as ($X_{chip}(t)$, $Y_{chip}(t)$, $Z_{chip}(t)$) with a position of point 3_t of cutting edge 2A being defined as the reference. A position of point 3_t of cutting edge 2A is the same as a position of point of cutting P. Based on the expressions (10), (11), and (12), a coordinate ($X(t)$, $Y(t)$, $Z(t)$) of tip end 3_1 of cutting edge 2A can be expressed in accordance with expressions below.

$$X(t)=R_{sh}(t)\cos\phi(t)-X_{chip}(t) \quad (13)$$

$$Y(t)=R_{sh}(t)\sin\phi(t)-Y_{chip}(t) \quad (14)$$

$$Z(t)=Z_{sh}(t)-Z_{chip}(t) \quad (15)$$

As set forth above, a coordinate ($X(t)$, $Y(t)$, $Z(t)$) of tip end 3_1 of cutting edge 2A is derived from such a condition that the inclination (first inclination) of the tangent line of cutting edge 2A at the point of cutting is equal to the target inclination (second inclination) of the tangent line of rotation symmetry plane 1A at the point of cutting in the cut plane of rotation symmetry plane 1A which passes through the Z axis and point of cutting P. The rotation symmetry plane can thus be machined in conformity with the target shape. In order to understand this, machining in an example where the condition above is not satisfied will be described below.

Figure 15:
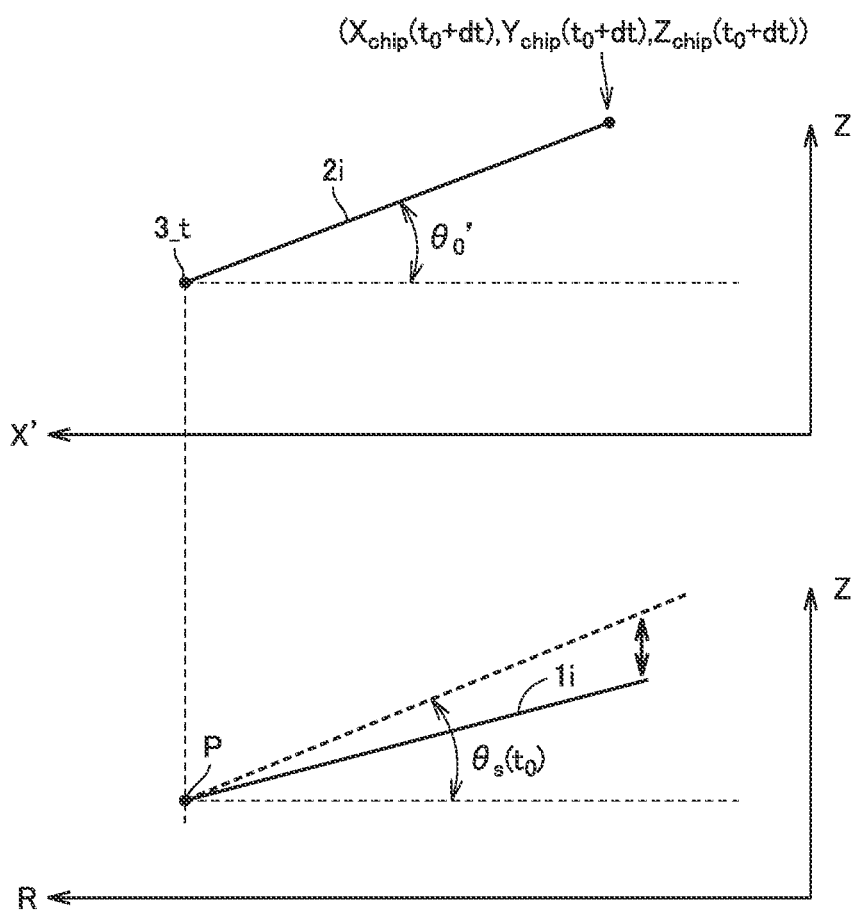
FIG. 15 is a diagram showing an example in which an inclination of a tangent line of the cutting edge is different from a target inclination of a tangent line of the rotation symmetry plane.

FIG. 15 is a diagram showing an example in which the inclination of the tangent line of cutting edge 2A is different from the target inclination of the tangent line of rotation symmetry plane 1A. As shown in FIG. 15, an angle of edge 2i projected on the X'Z plane (cut plane) is set to $\theta'_0$. An X-axis coordinate and a Y'-axis coordinate of edge 2i in the vicinity of point of cutting P are expressed in accordance with expressions below.

$$\Delta X'_{chip} = \frac{dX'_{chip}}{dt}\Delta t \quad (16)$$

$$X'_{chip}(t_0+\Delta t)=X'_{chip}(t_0)+\Delta X'_{chip} \quad (17)$$

$$Y'_{chip}(t_0+\Delta t)-\Delta X'_{chip}\tan\beta \quad (18)$$

Based on definition of the X' axis and the Y' axis, relation of $Y'_{chip}(t)=0$ is satisfied.

An R-axis coordinate of a point expressed with the coordinate ($X'_{chip}(t_0+\Delta t)$, $Y'_{chip}(t_0+\Delta t)$) is expressed in accordance with an expression below.

$$R_{chip}(t_0+\Delta t)=\sqrt{X'_{chip}(t_0+\Delta t)^2+Y'_{chip}(t_0+\Delta t)^2} \sim X'_{chip}(t_0)+\Delta X'_{chip}(t_0)+O(\Delta t^2) \quad (19)$$

An inclination of edge 2i in the RZ plane is expressed in accordance with an expression below.

$$\frac{dZ_{chip}(t_0)}{dR_{chip}(t_0)}=\frac{\Delta Z_{chip}}{\Delta X_{chip}}=-\tan\theta'_0 \quad (20)$$

An angle $\theta'_0$ of edge 2i in the X'Z plane is smaller than an ideal angle $\theta_S$ of rotation symmetry plane 1A ($\theta'_0<\theta_S(t_0)$). In this state, when edge 2i is fed, rotation symmetry plane 1A is excessively cut away.

The expression (16) to the expression (19) are satisfied by setting relation of $\Delta t<0$ also when relation of $\theta'_0>\theta_S(t_0)$ is satisfied. Since relation of $\theta'_0>\theta_S$ is satisfied, a portion yet to be cut away remains when edge 2i is fed.

(3) Setting of Amount of Variation of t

An amount of variation dt of t can be determined as follows. A length of cutting edge 2A used for cutting during a period in which the cutting progress degree is varied from t to (t+dt) is denoted as $dL_{chip}$. A length of the rotation symmetry plane cut with a region of cutting edge 2A having a length $dL_{chip}$ is denoted as $dL_{sh}$. $dL_{chip}$ and $dL_{sh}$ can be expressed in accordance with expressions below.

$$dL_{chip}=\sqrt{dX_{chip}^2+dY_{chip}^2+dZ_{chip}^2} \quad (21)$$

$$dL_{sh}=\sqrt{dR_{sh}^2+dZ_{sh}^2} \quad (22)$$

An amount of wear of cutting edge 2A increases with an amount of cutting. Therefore, $dL_{sh}/dL_{chip}$ can be defined as one indicator of an amount of wear at each position of cutting edge 2A. For a longer lifetime of cutting edge 2A, indicator $dL_{sh}/dL_{chip}$ is preferably equal at all positions in cutting edge 2A. Therefore, for example, dt is determined such that $dL_{sh}$ and $dL_{chip}$ are uniform. A condition for making a small length of each region with respect to dt uniform can be expressed in accordance with expressions below. A lifetime of the cutting edge can thus be longer. $L_{chip}$ represents a length of entire cutting edge 2A and $L_{sh}$ represents a length of entire rotation symmetry plane 1A.

$$\frac{dL_{chip}}{dt}=\sqrt{\left(\frac{dX_{chip}}{dt}\right)^2+\left(\frac{dY_{chip}}{dt}\right)^2+\left(\frac{dZ_{chip}}{dt}\right)^2}=L_{chip} \quad (23)$$

$$\frac{dL_{sh}}{dt}=\sqrt{\left(\frac{dR_{sh}}{dt}\right)^2+\left(\frac{dZ_{sh}}{dt}\right)^2}=L_{sh} \quad (24)$$

A more simplified method is to define cutting progress degree t as a variable which assumes (N+1) values of $t_0$, $t_1$, ..., and $t_N$. Cutting edge 2A can thus virtually be divided into N edges. Therefore, rotation symmetry plane 1A can virtually be divided into N regions machined with N respective edges. Definition as $t_0=0$ and $t_N=1$ is given.

In order to find a coordinate of tip end 3_1 of cutting edge 2A for each of (N+1) ts, a track connecting these points to one another can be defined as a track of tip end 3_1 of cutting edge 2A. Specifically, for each of $t_0$, $t_1$, ..., and $t_N$, a coordinate of point 3_t($X_{chip}(t)$, $Y_{chip}(t)$, $Z_{chip}(t)$) and a coordinate of point of cutting P ($R_{sh}(t)$, $Z_{sh}(t)$) are calculated. In addition, for each of $t_0$, $t_1$, ..., and $t_N$, angle of cutting $\theta(t)$ is found. With the expressions (13), (14), and (15), for each $t=t_0$, $t_1$, ..., and $t_N$, a coordinate of tip end 3_1 of cutting edge 2A is found. A track of cutting edge 2A is determined such that tip end 3_1 of cutting edge 2A successively traces positions shown with these coordinates. A divisor N can be determined based on accuracy in cutting and a minimum amount of feed of the cutting edge.

(4) Setting of Track in Accordance with Shape of Cutting Edge

A coordinate ($X_{chip}(t)$, $Y_{chip}(t)$, $Z_{chip}(t)$) of point 3_t of cutting edge 2A can be determined as below, in conformity with a shape of cutting edge 2A.

Figure 16:
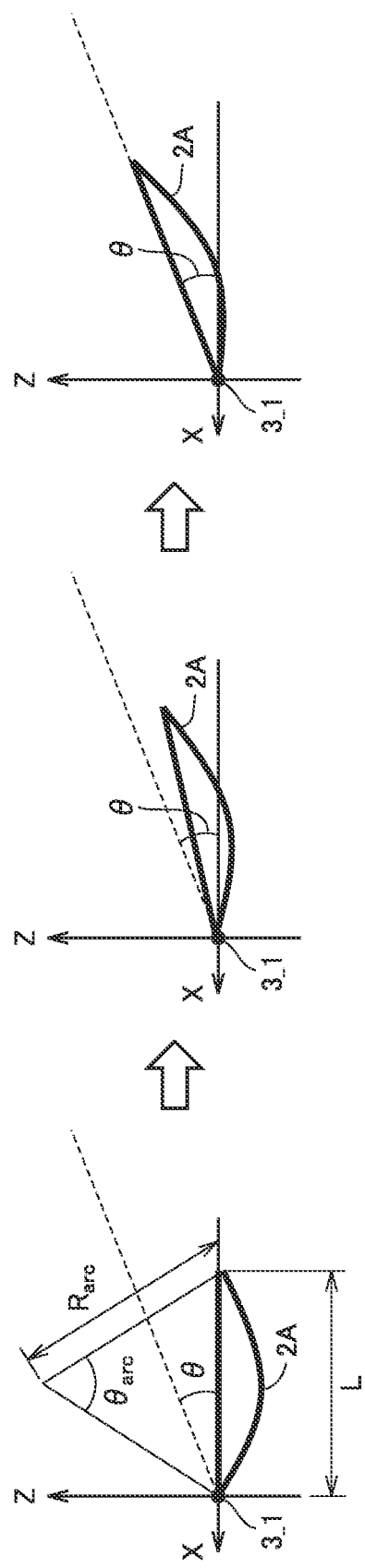
FIG. 16 is a diagram illustrating a method of calculating an inclination of the cutting edge on the XZ plane.
Figure 17:
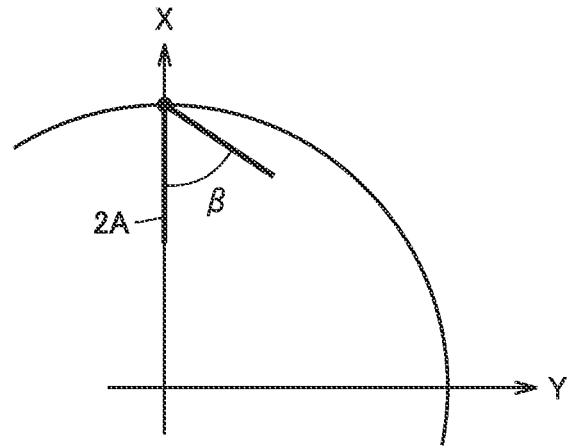
FIG. 17 is a diagram illustrating a method of calculating an inclination of the cutting edge on the XY plane.

FIG. 16 is a diagram illustrating a method of calculating an inclination of cutting edge 2A on the XZ plane. FIG. 17 is a diagram illustrating a method of calculating an inclination of cutting edge 2A on the XY plane. Referring to FIGS. 16 and 17, $R_{arc}$ represents a radius of curvature of cutting edge 2A. $\theta_{arc}$ represents a central angle of cutting edge 2A in an arc shape. L represents a length of a straight line connecting tip end 3_1 of cutting edge 2A and rear end 3_5 of cutting edge 2A to each other. When cutting edge 2A is linear, L corresponds to a length of cutting edge 2A. $R_{arc}$, $\theta_{arc}$, and L represent values that have already been known.

Cutting edge 2A is virtually divided into N edges on the XZ plane. When a curved cutting edge is divided, a coordinate $(X_{chip}(i), 0, Z_{chip}(i))$ of an ith division position (section) of the edge can be expressed as below. $\theta_i$ corresponds to an angle of division of $\theta_{arc}$ into N equal parts.

$$\theta_i = \theta_{arc} \times (i/N - 0.5)$$

$$X_{chip}(i) = L/2 + R_{arc} \times \sin \theta_i$$

$$Z_{chip}(i) = R_{arc} \times \cos \theta_i + R_{arc} \times \cos(\theta_{chip} \times 0.5)$$

When cutting edge 2A is linear, a length of the cutting edge is divided into N equal parts. The coordinate of the ith section $(X_{chip}(i), 0, Z_{chip}(i))$ can be expressed as below. L represents a length of cutting edge 2A between first end portion 3_1 and second end portion 3_5.

$$X_{chip}(i) = L/N \times i$$

$$Z_{chip}(i) = 0$$

Cutting edge 2A is pivoted by an angle $\theta'$ on the XZ plane around tip end 3_1 of cutting edge 2A. Relation below is satisfied between angle $\theta'$ and angles $\theta$ and $\beta$. Magnitude of angle $\theta'$ is equal to angle $\theta'$ shown in FIG. 12.

$$\sin \theta' = \frac{\tan \theta}{\sqrt{1 + \tan^2 \theta + \tan^2 \beta}} \quad (25)$$

In succession, cutting edge 2A is pivoted by angle $\beta$ on the XY plane around tip end 3_1 of cutting edge 2A. As a result of pivot twice, for each $t = t_0, t_1, \sim, t_N$, a coordinate $(X_{chip}(t), Y_{chip}(t), Z_{chip}(t))$ can be found.

Figure 18:
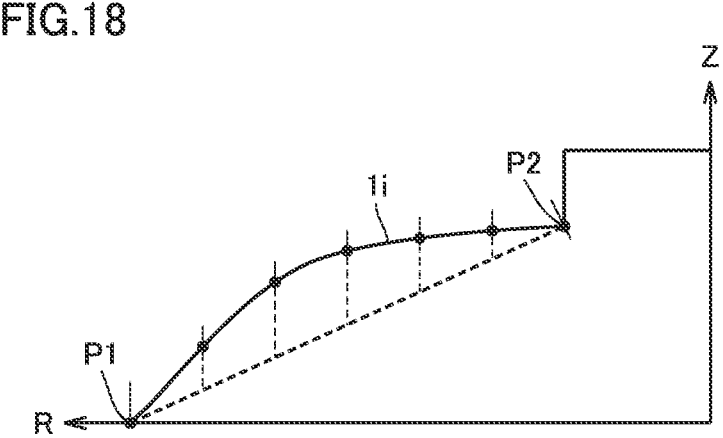
FIG. 18 is a diagram for illustrating a coordinate of a section of the rotation symmetry plane.

FIG. 18 is a diagram for illustrating a coordinate of a section of rotation symmetry plane 1A. Referring to FIG. 18, an R-axis coordinate $R_{sh}(i)$ and a Z-axis coordinate $Z_{sh}(i)$ of a section of rotation symmetry plane 1A is found for each $t = t_0, t_1, \ldots,$ and $t_N$.

When rotation symmetry plane 1A is expressed with a straight line on the RZ plane, R-axis coordinate $R_{sh}(i)$ and Z-axis coordinate $Z_{sh}(i)$ representing a position of a section of the ith region can be expressed as below. $R_{max}$, $R_{min}$, and H are values predetermined in designing machine component 1.

$$R_{sh}(i) = i \times (R_{min} - R_{max})/N + R_{max} \quad (26)$$

$$Z_{sh}(i) = i \times H/N \quad (27)$$

When rotation symmetry plane 1A is expressed with a curve on the RZ plane, R-axis coordinate $R_{sh}(i)$ and Z-axis coordinate $Z_{sh}(i)$ representing a position of a section of the ith region can be expressed as below.

Figure 19:
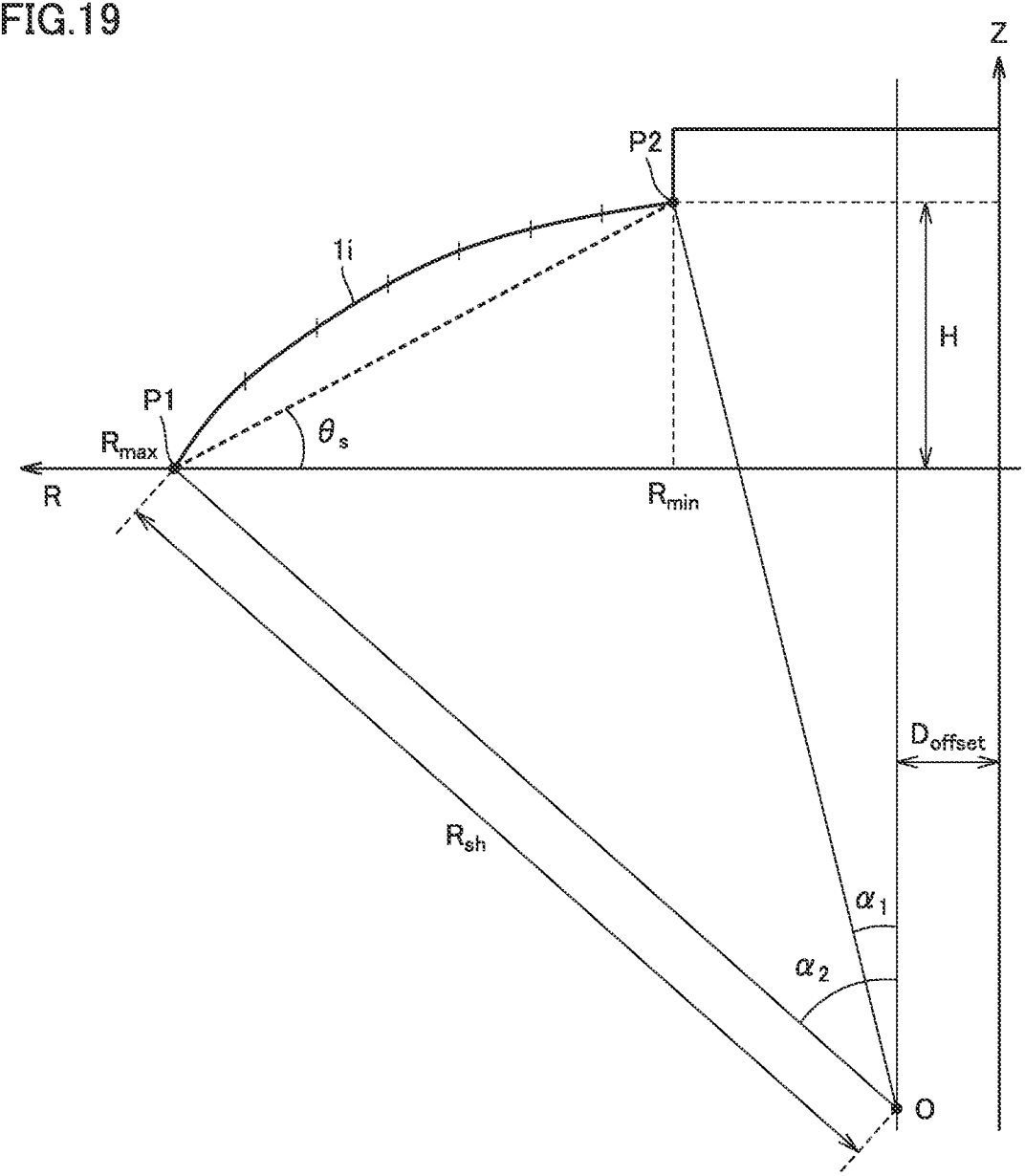
FIG. 19 is a diagram for illustrating a parameter of the rotation symmetry plane for calculating a track of the cutting edge.

FIG. 19 is a diagram for illustrating a parameter of the rotation symmetry plane for calculating a track of the cutting edge. Referring to FIG. 19, $R_{sh}$ represents a radius of curvature of rotation symmetry plane 1A. A point O corresponds to a center of curvature of rotation symmetry plane 1A. $D_{offset}$ represents a distance of point O from the Z axis. $D_{offset}$ corresponds to an R-axis coordinate of point O. $\alpha_1$ represents an angle formed by a straight line which passes through point O and is in parallel to the Z axis and a straight line connecting point O and cutting end position (an inner end point) P2 to each other. $\alpha_2$ represents an angle formed between the straight line which passes through point O and is in parallel to the Z axis and a straight line connecting point O and cutting start position (an outer end point) P1 to each other. Since $R_{max}$, $R_{min}$, H, and $\theta_S$ have already been described, subsequent description will not be repeated. $D_{offset}$ is a value predetermined in designing machine component 1.

R-axis coordinate $R_{sh}(i)$ and Z-axis coordinate $Z_{sh}(i)$ of the ith section can be expressed as below.

$$R_{sh}(i) = i \times (R_{min} - R_{max})/N + R_{max} \quad (28)$$

$$Z_{sh}(i) = R_{sh} \times \cos \alpha_2 + \sqrt{R_{sh}^2 - (R_{sh}(i)D_{offset})^2} \quad (29)$$

Relation between height H and angle $\theta_S$ below is satisfied.

$$H = R_{sh}(\cos \alpha_1 \cos \alpha_2) \quad (30)$$

$$\tan \theta_s = \frac{H}{R_{max} - R_{min}} \quad (31)$$

Relation below for angles $\alpha_1$ and $\alpha_2$ is satisfied.

$$\sin \alpha_1 = \frac{-D_{offset} + R_{min}}{R_{sh}} \quad (32)$$

$$\sin \alpha_2 = \frac{-D_{offset} + R_{max}}{R_{sh}} \quad (33)$$

With the methods above, a coordinate $(R_{sh}(t), Z_{sh}(t)) = (t = t_0, t_1, \ldots,$ and $t_N)$ of a point obtained by dividing rotation symmetry plane 1A can be found.

Angles $\theta(t)$, $\theta_S(t)$, $\beta(t)$ and $\phi(t)$ ($t = t1$ to $tN$) can be calculated with a method below.

Figure 20:
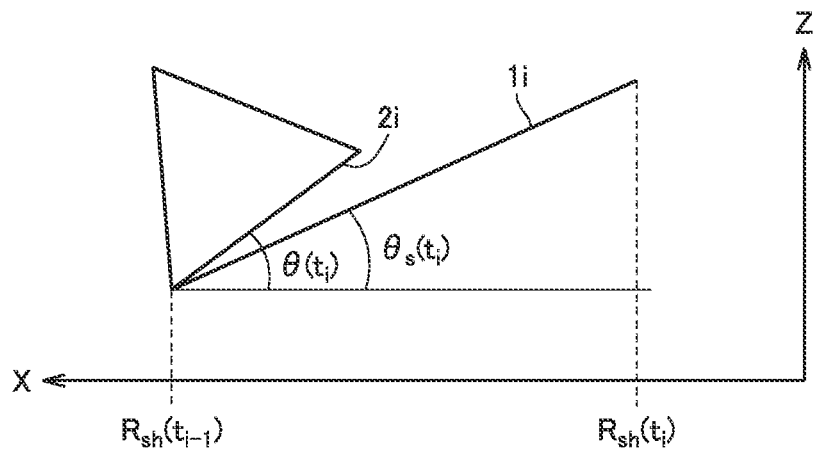
FIG. 20 is a diagram showing an angle used for calculation of the track of the cutting edge.

FIG. 20 is a diagram showing an angle used for calculation of the track of the cutting edge. Referring to FIG. 20, edge 2$i$ forms an angle $\theta(t_i)$ with respect to the X axis on the XZ plane. Region 1$i$ forms an angle $\theta_S(t_i)$ with respect to the X axis on the XZ plane. A range of X-axis coordinates of region 1$i$ is from $R_{sh}(t_{i-1})$ to $R_{sh}(t_i)$. A value for $R_{sh}(t_i)$ is smaller than $R_{sh}(t_{i-1})$.

Local angles $\theta_S(t_i)$, $\theta(t_i)$, and $\beta(t_i)$ are found based on the expression (1) to the expression (3), in accordance with expressions below.

$$\tan \theta_s(t_i) = -\frac{Z_{sh}(t_i) - Z_{sh}(t_{i-1})}{R_{sh}(t_i) - R_{sh}(t_{i-1})} \quad (34)$$

$$\tan \theta(t_i) = -\frac{Z_{chip}(t_i) - Z_{chip}(t_{i-1})}{X_{chip}(t_i) - X_{chip}(t_{i-1})} \quad (35)$$

$$\tan \beta(t_i) = -\frac{Y_{chip}(t_i) - Y_{chip}(t_{i-1})}{X_{chip}(t_i) - X_{chip}(t_{i-1})} \quad (36)$$

Local angles $\theta_S(t_i)$, $\theta(t_i)$, and $\beta(t_i)$ for each of $t_1$ to $t_N$ are approximately found based on the expressions (34) to (36), by using (N+1) points $t_0, t_1, \ldots,$ and $t_N$. Angle $\phi(t)$ ($t = t_1, \ldots,$ and $t_N$) is found from an expression below.

$$\frac{\cos(\phi(t) + \beta(t_i))}{\cos\beta(t_i)} = \frac{\tan\theta(t_i)}{\tan\theta_s(t_i)} \quad (37)$$

By approximation as $\phi(t_0)=\phi(t_1)$, $\phi(t)$ can be obtained for all of $t_0$ to $t_N$.

With the method described above, $R_{sh}(t)$, $Z_{sh}(t)$, $\phi(t)$, $X_{chip}(t)$, $Y_{chip}(t)$, and $Z_{chip}(t)$ can be obtained at each point of $t_0$ to $t_N$. Therefore, a track of tip end 3_1 of cutting edge 2A can be calculated based on the expressions (13) to (15).

3. Manufacturing Method

Figure 21:
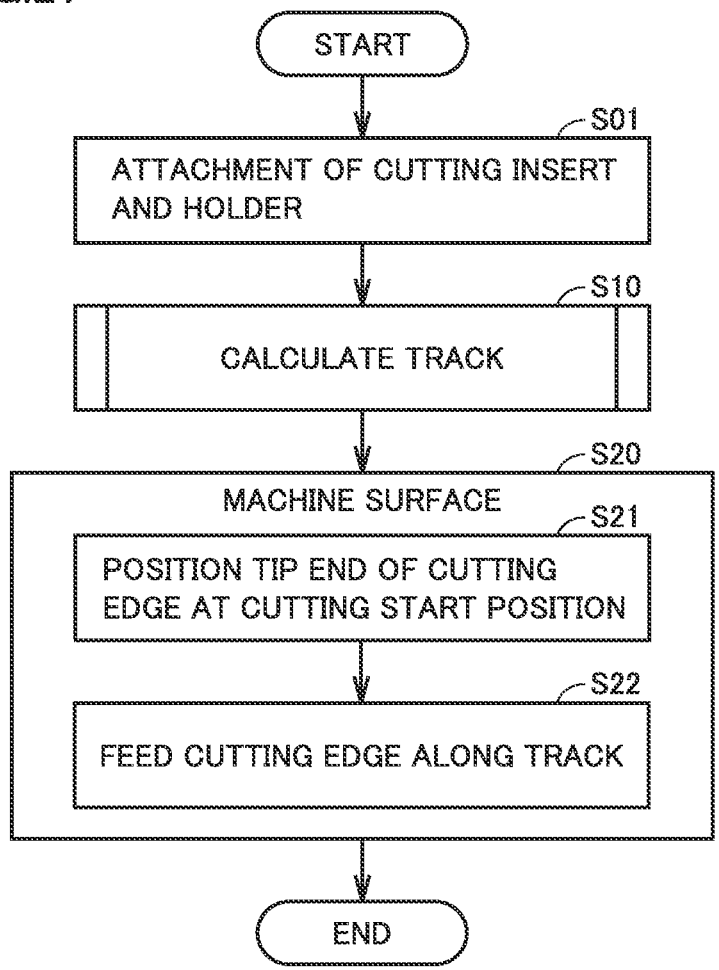
FIG. 21 is a flowchart showing a method for manufacturing a machine component according to the embodiment of the present invention.

FIG. 21 is a flowchart showing a method for manufacturing a machine component according to the embodiment of the present invention. As shown in FIG. 21, in step S01, cutting insert 2B is attached to holder 2. Holder 2 is attached to manufacturing apparatus 100 (feed mechanism 106).

In step S10, a track of tip end 3_1 of cutting edge 2A is calculated. In step S20, cutting edge 2A machines rotation symmetry plane 1A. Processing in steps S10 and S20 is performed as control unit 104 reads a program stored in storage unit 103.

Processing in step S20 will be described in detail. Initially, control unit 104 positions tip end 3_1 of cutting edge 2A at a cutting start position (step S21). Then, control unit 104 feeds cutting edge 2A such that a three-dimensional coordinate (X(t), Y(t), Z(t)) of tip end 3_1 of cutting edge 2A is varied in accordance with ($R_{sh}(t)\cos\phi(t)-X_{chip}(t)$, $R_{sh}(t)\sin\phi(t)-Y_{chip}(t)$, $Z_{sh}(t)-Z_{chip}(t)$) (step S22). In step S22, control unit 104 varies variable t (cutting progress degree) from $t_0$ (=0) to $t_N$ (=1). Each time t is varied, control unit 104 moves cutting edge 2A such that the coordinate of tip end 3_1 of cutting edge 2A is equal to the coordinate calculated in step S10.

In second and subsequent machining, processing in step S20 is repeated. Control unit 104 performs processing in steps S21 and S22.

After step S20 or before step S01, a further step necessary for manufacturing machine component 1 may be performed. For example, an inspection step for inspecting machine component 1 may be performed after step S20.

Figure 22:
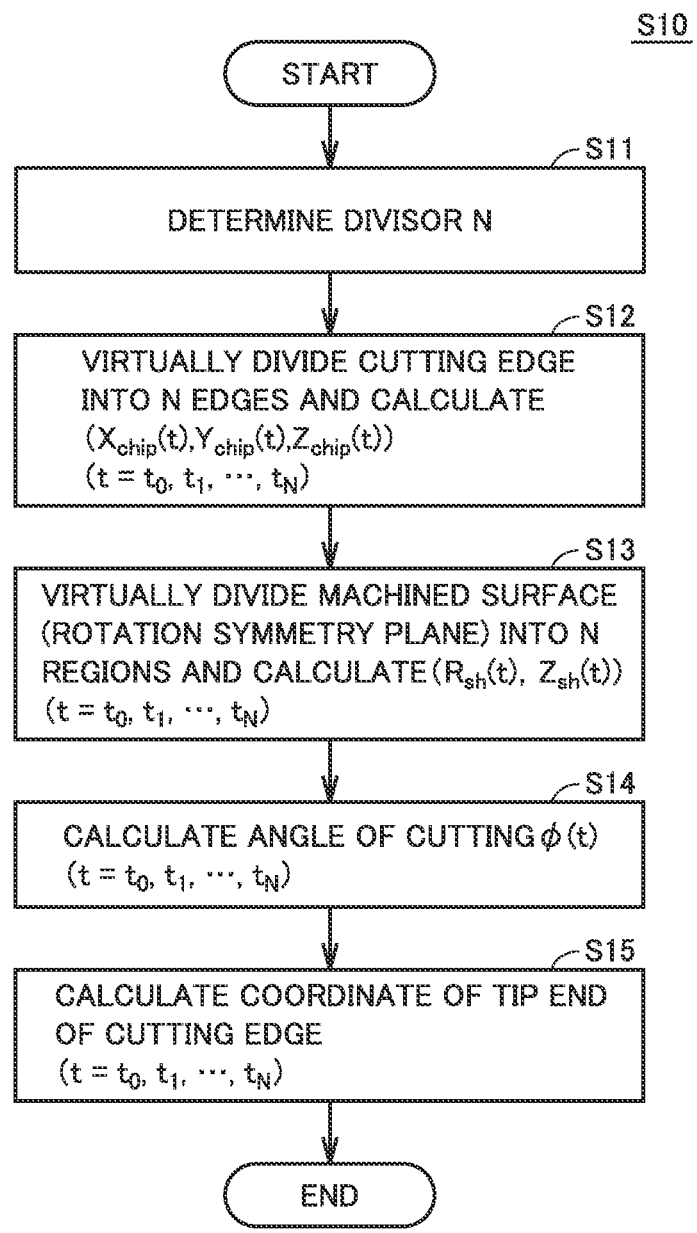
FIG. 22 is a flowchart showing details of processing for calculating a track shown in FIG. 21.

FIG. 22 is a flowchart showing details of processing for calculating a track shown in FIG. 21. This processing is performed by operation unit 110 shown in FIG. 2. Referring to FIG. 22, in step S11, operation unit 110 determines divisor N. For example, N can be determined such that an amount of feed of cutting edge 2A is set to a minimum value determined by restrictions imposed on manufacturing apparatus 100.

In processing in steps S12 to S15, a coordinate ($X_{chip}(t)$, $Y_{chip}(t)$, $Z_{chip}(t)$) of point 3_t of cutting edge 2A, a coordinate ($R_{sh}(t)$, $Z_{sh}(t)$) of point of cutting P, and angle $\phi(t)$ at each point of $t=t_0$ to $t_N$ are calculated. Values which have already been known in designing machine component 1 such as values for $R_{max}$, $R_{min}$, H, $\theta_S$, and $D_{offset}$ and a coordinate of point O are input to operation unit 110 through input unit 101.

In step S12, operation unit 110 virtually divides cutting edge 2A into N edges and calculates a coordinate ($X_{chip}(t)$, $Y_{chip}(t)$, $Z_{chip}(t)$) of point 3_t of cutting edge 2A at each point of $t=t_0$ to $t_N$.

In step S13, operation unit 110 virtually divides the machined surface (rotation symmetry plane 1A) into N regions and calculates a coordinate ($R_{sh}(t)$, $Z_{sh}(t)$) of point of cutting P at each point of $t=t_0$ to $t_N$. In step S14, operation unit 110 calculates angle $\phi(t)$ at each point of $t=t_0$ to $t_N$.

In step S15, operation unit 110 calculates a coordinate of tip end 3_1 of cutting edge 2A at each point of $t=t_0$ to $t_N$ by using $R_{sh}(t)$, $Z_{sh}(t)$, $\phi(t)$, $X_{chip}(t)$, $Y_{chip}(t)$, and $Z_{chip}(t)$. A position on the track of tip end 3_1 of cutting edge 2A is thus calculated. As processing in step S15 ends, processing in step S10 ends.

Limitation to such processing that step S20 shown in FIG. 21 is performed in succession to step S10 is not intended. Processing for calculating a track in step S10 may be performed independently of processing in step S20. A computer which performs processing in step S10 may be a computer provided outside manufacturing apparatus 100.

4. Example of Machining Method (1) Curved Cutting Edge-Curved Rotation Plane

Figure 23:
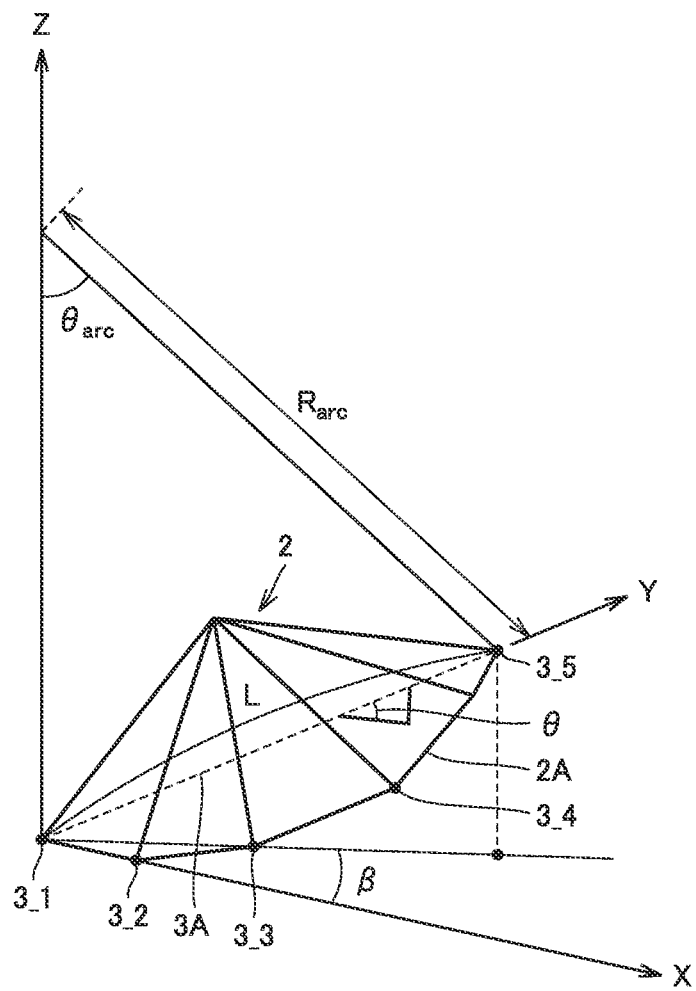
FIG. 23 is a diagram showing five regions of the cutting edge for monitoring a trace of the cutting edge.

FIG. 23 is a diagram showing five regions of cutting edge 2A for monitoring a trace of cutting edge 2A. FIG. 23 shows regions 3_2, 3_3, and 3_4 of cutting edge 2A with points, in addition to tip end 3_1 and rear end 3_5. Positions of regions 3_2, 3_3, and 3_4 correspond to positions of division of a length between tip end 3_1 and rear end 3_5 into four equal parts. A trace of cutting edge 2A will be described in detail later.

Figure 24:
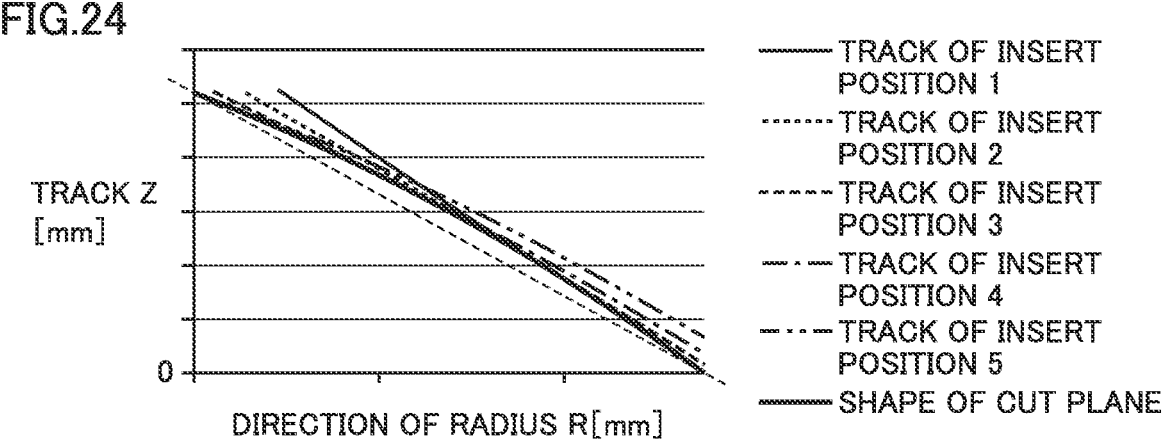
FIG. 24 is a diagram showing a result of calculation of machining of a curved rotation plane with a curved cutting edge.

FIG. 24 is a diagram showing a result of calculation of machining of a curved rotation plane with a curved cutting edge. An "insert position 1," an "insert position 2," an "insert position 3," an "insert position 4," and an "insert position 5" shown with each curve in the graph correspond to tip end 3_1, region 3_2, region 3_3, region 3_4, and rear end 3_5 of cutting edge 2A shown in FIG. 23, respectively.

As shown in FIG. 24, a shape of a rotation symmetry plane (cut plane) is determined by a track of each position of cutting edge 2A (cutting insert 2B). Specifically, a shape of the rotation symmetry plane on the RZ plane corresponds to an envelope of a track drawn by each region of cutting edge 2A on the RZ plane.

The track of each region of cutting edge 2A can be determined by $R_{sh}$, $R_{max}$, $R_{min}$, and $\theta_S$ in connection with the rotation symmetry plane, angles $\beta$, $\theta$, L, and $R_{chip}$ in connection with the cutting edge, and divisor N. A design value for machine component 1 can be used for each parameter above. As can be seen in comparison between a dashed straight line and a curve showing a shape of the cut plane, the machined rotation symmetry plane has a prescribed radius of curvature.

Figure 25:
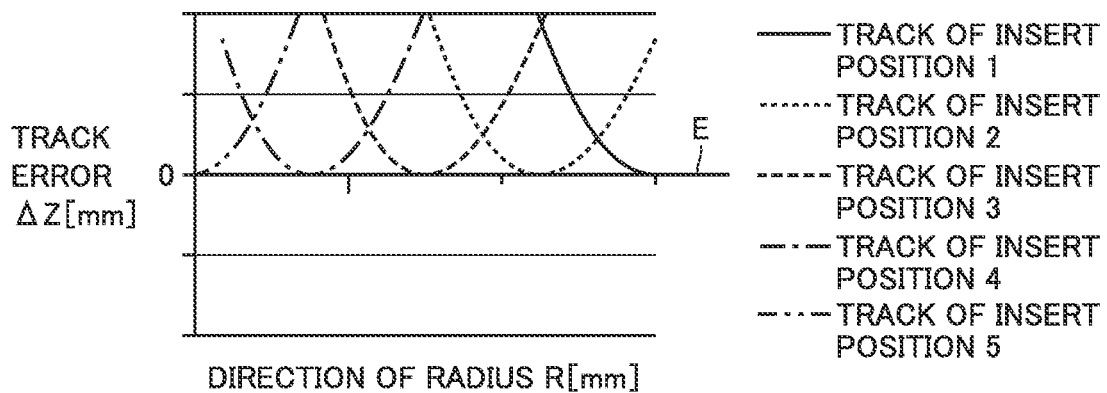
FIG. 25 is a diagram showing a track error in a direction of a Z axis based on the result of calculation shown in FIG. 24.

FIG. 25 is a diagram showing a track error $\Delta Z$ in the direction of the Z axis based on the result of calculation shown in FIG. 24. Track error $\Delta Z$ corresponds to a difference calculated by subtracting a Z-axis coordinate of a target rotation symmetry plane from a coordinate in the direction of the Z axis of the machined rotation symmetry plane. $\Delta Z<0$ represents the Z-axis coordinate of the machined surface being smaller than that of a target surface. Namely, $\Delta Z<0$ represents the machined surface being lower than a target height. Namely, $\Delta Z<0$ represents a result of machining indicative of excessive cut-away. $\Delta Z>0$ represents the machined surface being higher than the target height. Namely, $\Delta Z>0$ represents a result of machining indicative of a remaining portion yet to be cut away.

FIG. 25 shows a track drawn at each of five insert positions as variation in $\Delta Z$ with respect to a direction of radius R. Five tracks corresponding to respective insert positions 1 to 5 are aligned along the direction of the R axis. The five tracks show that the cutting edge is fed from a peripheral portion of the rotation symmetry plane toward the center of the rotation symmetry plane. Therefore, the track of insert position 1 represents an outermost track of the five tracks aligned along the R axis. The track of insert position 5 represents an innermost track of the five tracks aligned along the R axis.

In FIG. 25, ΔZ of the machined rotation symmetry plane can be represented by an envelope E of the five tracks. As shown in FIG. 25, ΔZ of envelope E is substantially 0. FIGS. 24 and 25 show that the machining method according to this embodiment can achieve accurate machining of a surface having a prescribed radius of curvature with curved cutting edge 2A.

(2) Curved Cutting Edge-Linear Rotation Plane

Figure 26:
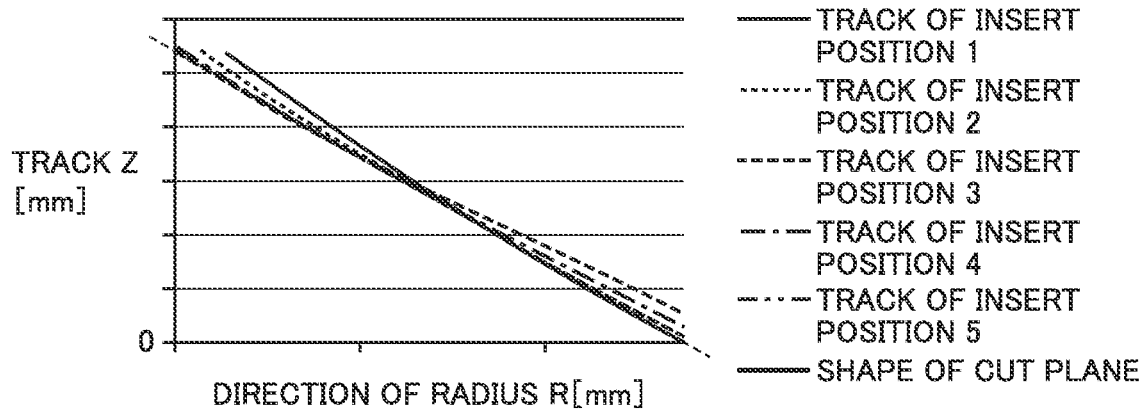
FIG. 26 is a diagram showing a result of calculation of machining of a linear rotation plane with the curved cutting edge.
Figure 27:
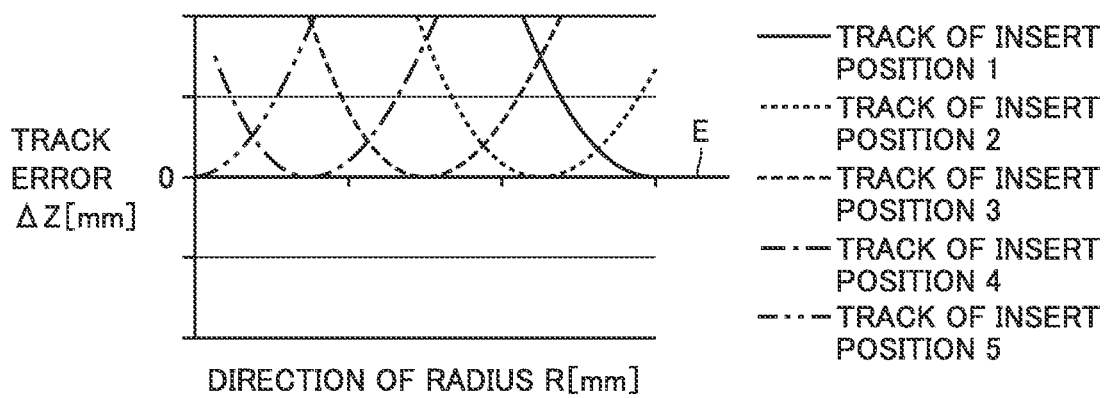
FIG. 27 is a diagram showing a track error in the direction of the Z axis based on the result of calculation shown in FIG. 26.

FIG. 26 is a diagram showing a result of calculation of machining of a linear rotation plane with the curved cutting edge. FIG. 27 is a diagram showing track error ΔZ in the direction of the Z axis based on the result of calculation shown in FIG. 26. As shown in FIGS. 26 and 27, the rotation symmetry plane is expressed as a straight line on the RZ plane of the rotation symmetry plane. ΔZ of envelope E of each track is substantially 0. FIGS. 26 and 27 show that the machining method according to this embodiment can achieve accurate machining of the linear rotation plane with curved cutting edge 2A.

(3) Linear Cutting Edge-Curved Rotation Plane

FIG. 28 is a schematic diagram of linear cutting edge 2A. As shown in FIG. 28, regions 3_2, 3_3, and 3_4 of cutting edge 2A are arranged on the straight line connecting tip end 3_1 of cutting edge 2A and rear end 3_5 of cutting edge 2A to each other. Similarly to the curved cutting edge shown in FIG. 23, positions of regions 3_2, 3_3, and 3_4 correspond to positions of division of length L between tip end 3_1 and rear end 3_5 into four equal parts.

FIG. 29 is a diagram showing a result of calculation of machining of a curved rotation plane with the linear cutting edge. FIG. 30 is a diagram showing track error ΔZ in the direction of the Z axis based on the result of calculation shown in FIG. 29. As shown in FIGS. 29 and 30, the rotation symmetry plane has a prescribed radius of curvature. ΔZ of envelope E of each track is substantially 0. FIGS. 29 and 30 show that the machining method according to this embodiment can achieve accurate machining of the curved rotation plane with linear cutting edge 2A.

(4) Linear Cutting Edge-Linear Rotation Plane

Figure 31:
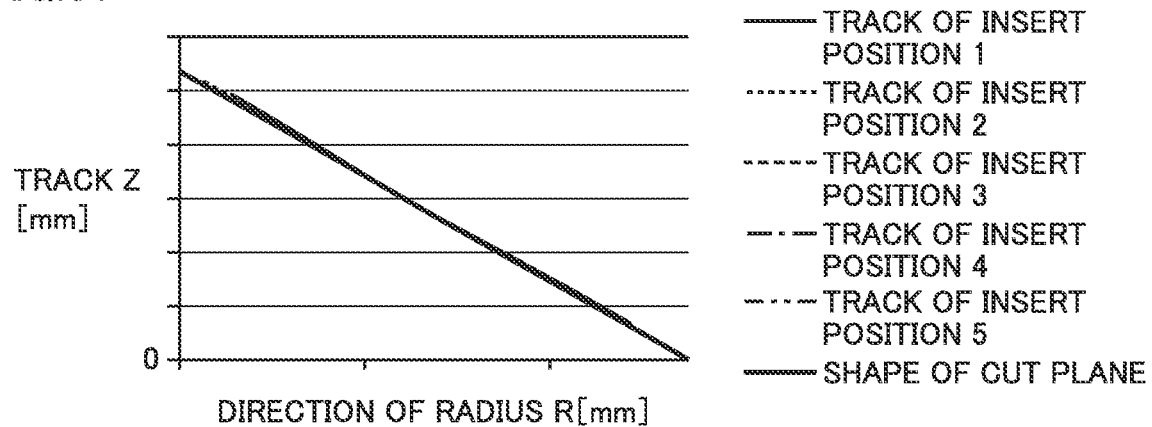
FIG. 31 is a diagram showing a result of calculation of machining of a linear rotation plane with the linear cutting edge.
Figure 32:
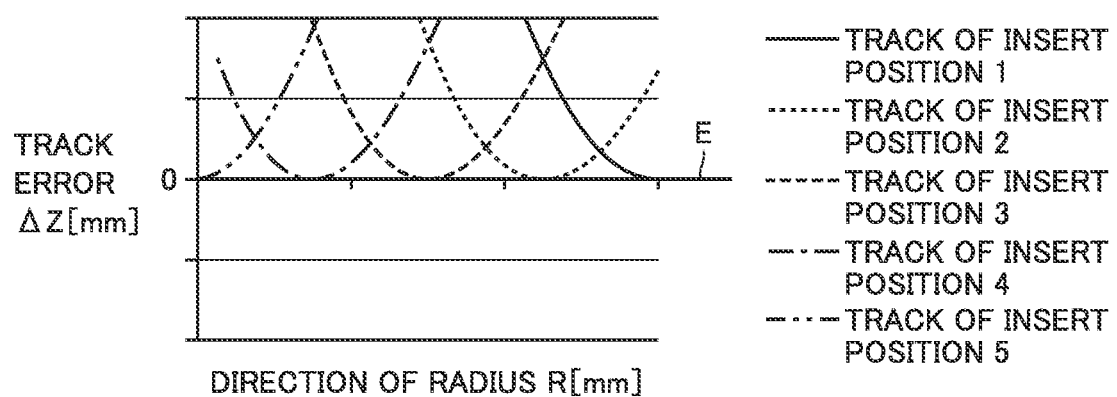
FIG. 32 is a diagram showing a track error in the direction of the Z axis based on the result of calculation shown in FIG. 31.

FIG. 31 is a diagram showing a result of calculation of machining of a linear rotation plane with the linear cutting edge. FIG. 32 is a diagram showing track error ΔZ in the direction of the Z axis based on the result of calculation shown in FIG. 31. As shown in FIGS. 31 and 32, the rotation symmetry plane is shown as the straight line on the RZ plane. ΔZ of envelope E of each track is substantially 0. FIGS. 31 and 32 show that the machining method according to this embodiment can achieve accurate machining of the linear rotation plane with linear cutting edge 2A.

According to the embodiment of this invention, a cutting edge having any curvature can machine a rotation symmetry plane having any curvature. "Any curvature" is not limited to a finite curvature. For example, a straight line can be regarded as a graphic having an infinite curvature. Therefore, "any curvature" may be a finite or infinite curvature.

While t is varied from 0 to 1, only one of $R_{sh}(t)$ and $Z_{sh}(t)$ may be varied and the other may be constant. Namely, rotation symmetry plane 1A may be a side surface of a column. A generating line in this case is in parallel to an axial line of rotation (Z axis).

Directions of the X axis, the Y axis, and the Z axis are not limited as shown in each drawing. The positive direction of each of the X axis, the Y axis, and the Z axis may be opposite to the orientation shown in the drawings. The X axis, the Y axis, and the Z axis can also be interchanged.

An embodiment of the present invention is applicable also to machining of a workpiece without being limited to a machine component.

It should be understood that the embodiments disclosed herein are illustrative and non-restrictive in every respect. The scope of the present invention is defined by the terms of the claims, rather than the embodiments above, and is intended to include any modifications within the scope and meaning equivalent to the terms of the claims.

REFERENCE SIGNS LIST 1 machine component; 1A rotation symmetry plane; 11 to 1N, 1i region (rotation symmetry plane); 2 holder; 2A cutting edge; 21 to 2N edge; 2B cutting insert; 3_1 tip end (cutting edge); 3_5 rear end (cutting edge); 3_t point (cutting edge); 3_2, 3_3, 3_4 region (cutting edge); 10 axial line of rotation; 100 manufacturing apparatus; 101 input unit; 102 display unit; 103 storage unit; 104 control unit; 105 drive unit; 106 feed mechanism; 110 operation unit; E envelope (track); P point of cutting; O point; P1 cutting start position; P2 cutting end position; and S01, S10 to S15, S20 to S22 step

The invention claimed is:

1. A method for manufacturing a machine component having a rotation symmetry plane, the method comprising:
    machining the rotation symmetry plane by feeding a linear or curved cutting edge while the cutting edge is in contact with a point of cutting of the rotation symmetry plane,
    the machining the rotation symmetry plane including
        determining a track of the cutting edge by using a three-dimensional orthogonal coordinate system in which an axial line of rotation is defined as a Z axis, an axis in a radial direction of the rotation symmetry plane is defined as an X axis, and an axis orthogonal to both of the Z axis and the X axis is defined as a Y axis, and
        feeding the cutting edge along the track,
    the determining the track determining the track in accordance with a condition that
        (1) a first end portion of the cutting edge is positioned at a cutting start position of the rotation symmetry plane,
        (2) N (N being an integer not smaller than 2) regions defined by division of the cutting edge successively come in contact with the rotation symmetry plane,
        (3) a first inclination corresponding to an inclination of a tangent line at a point of cutting of each of the N regions is equal to a second inclination corresponding to a target inclination of a tangent line which passes through the point of cutting and comes in contact with the rotation symmetry plane in a cut plane of the rotation symmetry plane including the Z axis and the point of cutting, and
        (4) a second end portion of the cutting edge is positioned at a cutting end position of the rotation symmetry plane.

2. The method for manufacturing a machine component according to claim 1, wherein
    the determining the track includes calculating a coordinate (X(t), Y(t), Z(t)) of the first end portion of the cutting edge in accordance with $$X(t) = (R_{sh}(t)\cos\phi(t) - X_{Chip}(t))$$

$$Y(t) = (R_{sh}(t)\sin\phi(t) - Y_{chip}(t))$$

$$Z(t) = (Z_{sh}(t) - Z_{chip}(t)),$$

where a variable t assumes (N+1) values not smaller than 0 and not greater than 1,

- a coordinate (X(0), Y(0), Z(0)) is a coordinate of the first end portion of the cutting edge positioned at the cutting start position and an origin of the three-dimensional orthogonal coordinate system,
- $(X_{chip}(t), Y_{chip}(t), Z_{chip}(t))$ represents a coordinate representing a position of the cutting edge in contact with the rotation symmetry plane at the point of cutting with the first end portion of the cutting edge being defined as a reference,
- $(X_{chip}(1), Y_{chip}(1), Z_{chip}(1))$ represents a coordinate of the second end portion of the cutting edge positioned at the cutting end position,
- $R_{sh}(t)$ represents a radius of the rotation symmetry plane corresponding to a distance from a center of rotation on the Z axis to the point of cutting,
- $Z_{sh}(t)$ represents a coordinate on the Z axis of the center of rotation,
- $\phi(t)$ represents an angle formed by a straight line connecting the point of cutting projected on an XY plane and an origin of the XY plane to each other with respect to the X axis, and satisfies a condition of $\cos(\phi(t)+\beta(t)/\cos\beta(t)=\tan\theta(t)/\tan\theta_S(t)$ in order to set the first inclination of the cutting edge to be equal to the second inclination of the rotation symmetry plane,
- $\theta(t)$ represents an angle formed by an ith region in contact with the point of cutting of the N regions of the cutting edge with respect to the X axis when the ith region is projected on an XZ plane,
- $\beta(t)$ represents an angle formed by the ith region with respect to the X axis when the ith region is projected on the XY plane, and
- $\theta_S(t)$ represents an angle representing the second inclination.

3. The method for manufacturing a machine component according to claim 2, wherein
the cutting edge is in a curved shape, and
t is determined to divide a central angle determined in accordance with a radius of curvature of the curved shape into N equal parts.

4. The method for manufacturing a machine component according to claim 2, wherein
the cutting edge is linear, and
t is determined to divide a length of the cutting edge between the first end portion and the second end portion into N equal parts.

5. An apparatus for manufacturing a machine component, with which the method for manufacturing a machine component according to claim 1 is performed.

* * * * *